(12) United States Patent  (10) Patent No.: US 8,521,987 B2
Iwamitsu et al.  (45) Date of Patent: Aug. 27, 2013

(54) ALLOCATION AND RELEASE OF STORAGE AREAS TO VIRTUAL VOLUMES

(75) Inventors: Koji Iwamitsu, Odawara (JP);
Yoshinori Ohira, Kawasaki (JP);
Katsuhiro Uchiumi, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 199 days.

(21) Appl. No.: 12/664,385

(22) PCT Filed: Mar. 18, 2009

(86) PCT No.: PCT/JP2009/001199
§ 371 (c)(1),
(2), (4) Date: Dec. 11, 2009

(87) PCT Pub. No.: WO2010/106574
PCT Pub. Date: Sep. 23, 2010

(65) Prior Publication Data
US 2011/0197023 A1  Aug. 11, 2011

(51) Int. Cl.
*G06F 12/04* (2006.01)
(52) U.S. Cl.
USPC .................. 711/173; 711/114; 711/E12.007
(58) Field of Classification Search
USPC .................. 711/114, 173, E12.002, E12.007
See application file for complete search history.

(56) References Cited

U.S. PATENT DOCUMENTS

| | | | |
|---|---|---|---|
| 6,823,442 B1 | 11/2004 | Cameron | |
| 7,904,749 B2 | 3/2011 | Kawaguchi | |
| 2005/0114350 A1* | 5/2005 | Rose et al. | 707/10 |
| 2006/0069885 A1* | 3/2006 | Matsui et al. | 711/154 |
| 2007/0156957 A1 | 7/2007 | MacHardy et al. | |
| 2007/0168634 A1 | 7/2007 | Morishita et al. | |
| 2007/0245114 A1* | 10/2007 | Kakui et al. | 711/170 |
| 2007/0266218 A1* | 11/2007 | Achiwa | 711/170 |
| 2008/0059752 A1* | 3/2008 | Serizawa | 711/173 |
| 2008/0126734 A1* | 5/2008 | Murase | 711/170 |
| 2008/0201535 A1* | 8/2008 | Hara | 711/153 |
| 2008/0270720 A1* | 10/2008 | Tanabe et al. | 711/162 |
| 2008/0270733 A1 | 10/2008 | Sakaguchi et al. | |
| 2008/0282047 A1* | 11/2008 | Arakawa et al. | 711/162 |

FOREIGN PATENT DOCUMENTS

| | | |
|---|---|---|
| EP | 1903428 A2 | 3/2008 |
| JP | 2007193573 | 8/2007 |
| JP | 2008-059353 A | 3/2008 |
| JP | 2008059353 | 3/2008 |
| JP | 2008-276326 A | 11/2008 |
| JP | 2008276326 | 11/2008 |

* cited by examiner

*Primary Examiner* — Hal Schnee
(74) *Attorney, Agent, or Firm* — Mattingly & Malur, PC

(57) ABSTRACT

A storage control device includes a controller managing a plurality of first storage areas provided with a plurality of storage devices and a plurality of second storage areas in a particular first storage area of the plurality of first storage areas. Each of the plurality of first storage areas having a first fixed area size and each of the second plurality of storage areas having a second fixed area size which is smaller than the first fixed area size. The controller is adapted to allocate the particular first storage area to the virtual volume so that data of the write command are written to a particular second storage area of the plurality of second storage areas when a write command to a virtual volume of a plurality of virtual volumes is received.

26 Claims, 28 Drawing Sheets

FIG. 24
(a) CASE OF NOT APPLYING THIS INVENTION
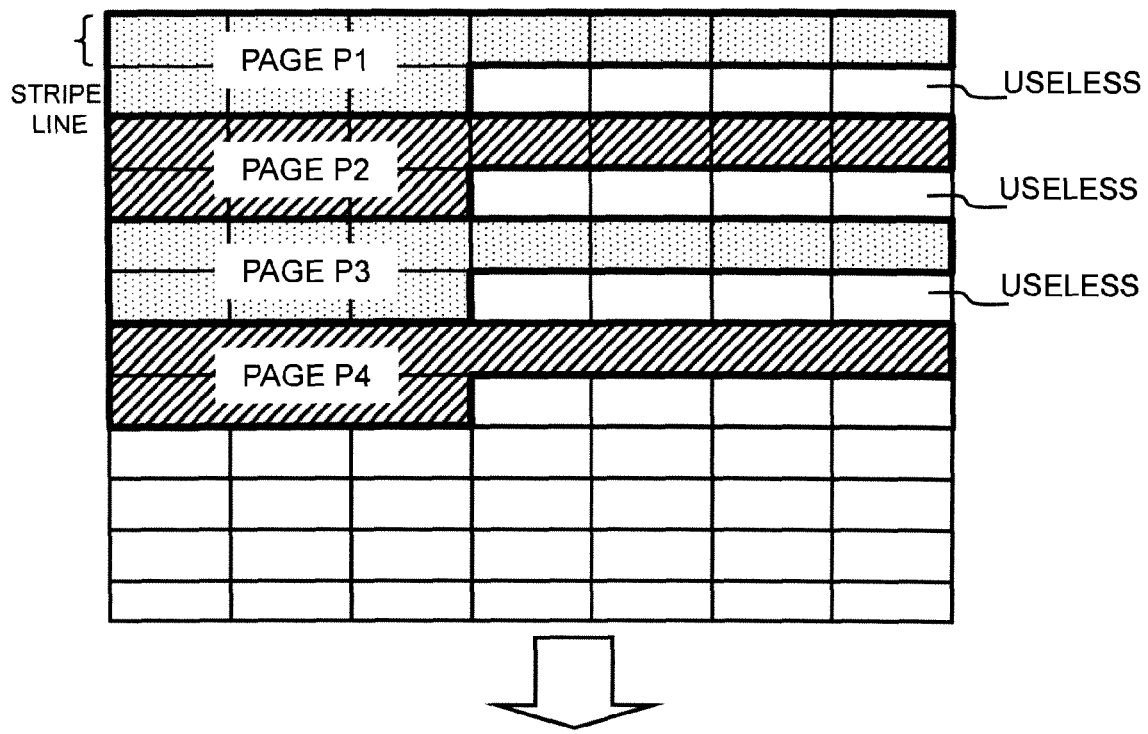
(b) CASE OF APPLYING THIS INVENTION
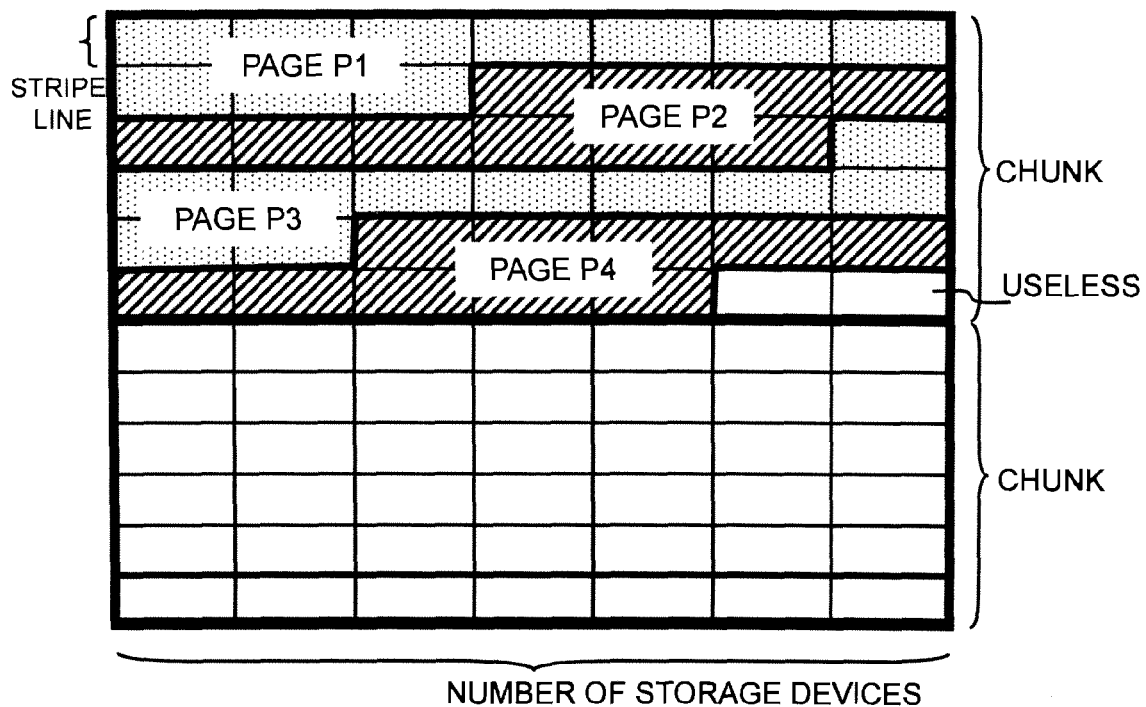

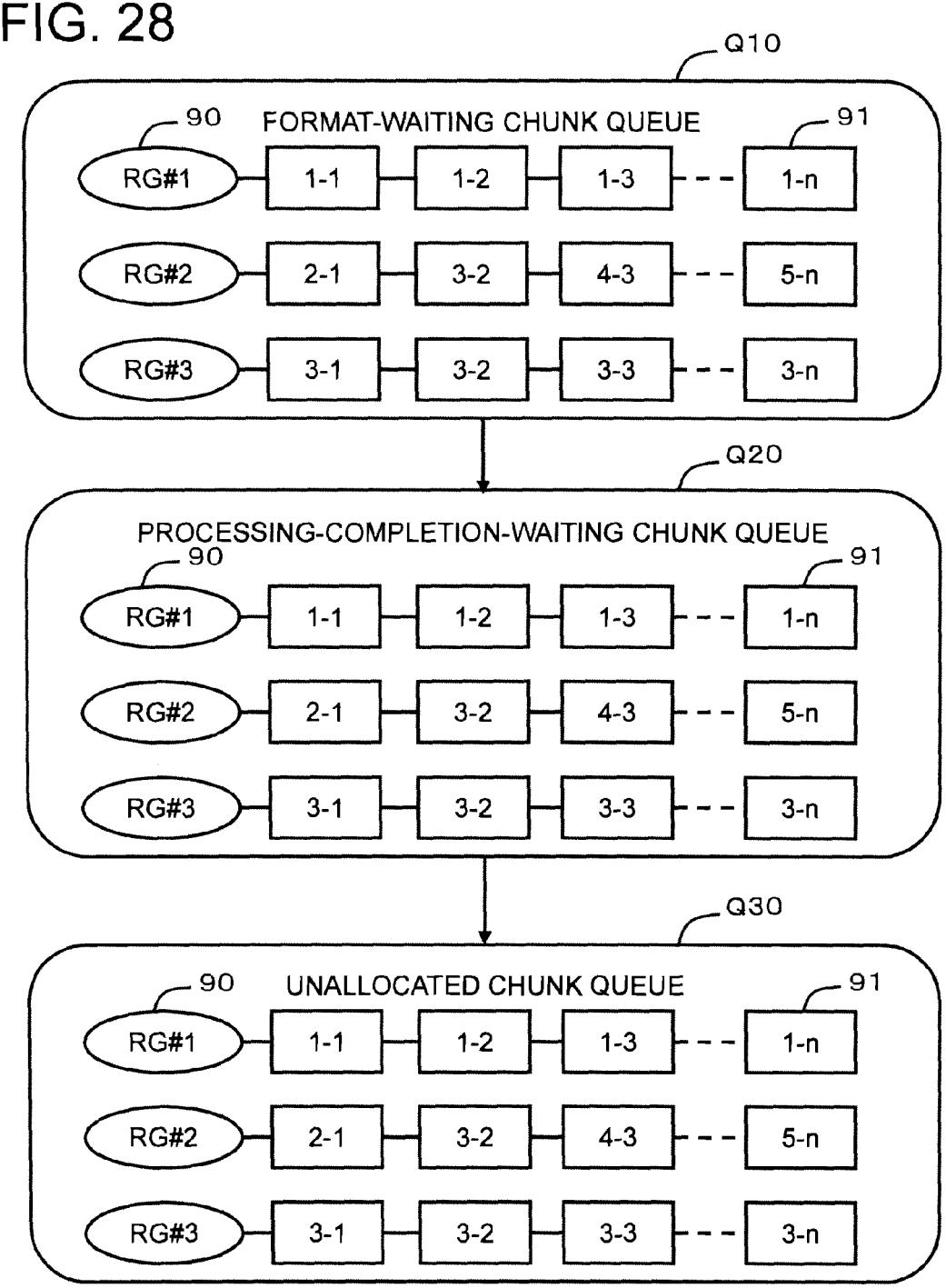

ALLOCATION AND RELEASE OF STORAGE AREAS TO VIRTUAL VOLUMES

TECHNICAL FIELD

This invention relates to controlling methods of a storage control device and virtual volumes.

BACKGROUND ART

Business users and others manage data using storage control devices. A storage control device creates logical volumes in a storage area based on RAID (Redundant Array of Independent Disks). The logical volumes are provided to a host computer (hereinafter referred to as a host).

Because the amount of data used by a user increases day by day, the volume size set to match the current status becomes insufficient sooner or later. On the other hand, if the size is set excessively larger than the currently required size considering the increase of the data amount, there are many disk drives that are not immediately required and the cost increases.

Therefore, the technology of preparing virtual logical volumes and, in accordance with the actual use, allocating physical storage areas to the virtual logical volumes is proposed (Patent Literature 1).

PATENT LITERATURE 1

U.S. Pat. No. 6,823,442

SUMMARY OF INVENTION

Technical Problems

In the above-mentioned Patent Literature (U.S. Pat. No. 6,823,442), a storage server system, if receiving a write request related to a block address in a virtual volume, allocates a logical data page to the virtual volume page address corresponding to the block address. As a result, the data is written to the logical data page.

The above-mentioned literature discloses management methods for configuring a logical disk of a specific RAID level with reference to conceptual areas named chunklets that can be obtained from areas in the multiple physical disks.

However, the management methods are completely different from the management methods of physical areas in a storage control device which configure RAID groups in units of physical disk drives. Therefore, the management methods described in the above-mentioned literature cannot be applied as is to the storage control device configuring RAID groups in units of physical disk drives.

If the technology described in the above-mentioned literature is applied to the above-mentioned management methods, in a storage control device capable of providing both normal logical volumes and virtual logical volumes, the problem arises that the normal logical volumes and the virtual logical volumes have different management methods of physical areas, which complicates the configuration of the storage control device. At this point, a normal logical volume means a logical volume to which the same capacity of the physical area (a physical storage area) as the size of the volume is allocated in advance when the volume is created. A virtual logical volume means a logical volume whose volume size is virtualized and to which a physical area is allocated in accordance with write requests.

That is, if the technology described in the above-mentioned literature is applied to a storage control device configuring RAID groups in units of physical disk drives, the physical area must be managed by multiple different management methods, which complicates the configuration and increases the development cost.

Furthermore, in the above-mentioned literature, if no table page corresponding to the virtual volume page address is allocated when receiving a write request, the storage server system allocates table pages at first, and then allocates logical data pages. Therefore, by the technology described in the above-mentioned literature, the problem arises that data pages must be allocated after table pages are allocated, which deteriorates the performance of the write processing.

Furthermore, in the above-mentioned literature, for performing the above-mentioned allocation processing, an exclusive pool for data pages and another exclusive pool for table pages must be separated, which complicates the system configuration.

Therefore, an object of this invention is providing control methods of a storage control device and virtual volumes capable of efficiently making the correspondence of storage areas to virtual volumes considering the physical configuration of RAID groups. Another object of this invention is providing control methods of the storage control device and the virtual volumes capable of configuring virtual volumes using RAID groups evenly. A third object of this invention is providing control methods of the storage control device and the virtual volumes capable of efficiently making the correspondence of storage areas to virtual volumes and at the same time capable of improving the response performance of the virtual volumes. Further objects of this invention will be disclosed by the embodiments to be described later.

Solution to Problems

For solving the above-mentioned problems, a storage control device complying with a first perspective of this invention comprises virtually created virtual volumes, a pool unit for managing multiple first physical storage areas created in stripes across multiple storage devices configuring RAID groups and including multiple second physical storage areas, and a control unit for, in accordance with write requests to the virtual volumes, making the correspondence of the specified second physical storage areas among the second physical storage areas included in the first physical storage areas to the specified areas in virtual volumes corresponding to the write requests and making the correspondence of a virtual volume to a first physical storage area.

By a second perspective, with reference to the first perspective, multiple RAID groups are installed, and each first physical storage area included in each RAID group is, when formatted, connected to an unallocated queue selected in the specified order by each RAID group while the control unit, when creating virtual volumes, confirms whether the virtual volumes were normally created or not by making the correspondence of each virtual storage area in the virtual volumes to another specified second physical storage area. Furthermore, the control unit is, when receiving a release command for releasing the second physical storage area corresponding to a virtual volume, supposed to release the second physical storage area specified by the release command. Furthermore, the control unit, (1) if there is a first physical storage area that is currently used, selects an unused second physical storage area next to the second physical storage area selected the last time from the second physical storage areas included in the currently used first physical storage area and makes it correspond to the virtual storage area corresponding to the write request, (2) if there is no unused second physical storage area in the currently used first physical storage area, selects the second physical storage area released by the release command from each second physical storage area included in the currently used first physical storage area and makes it correspond to the virtual storage area corresponding to the write request, (3) if there is no released second physical storage area in the currently used first physical storage area, selects the second physical storage area released by the release command from each second physical storage area included in the previously used first physical storage areas used before the currently used first physical storage area and makes it correspond to the virtual storage area corresponding to the write request or, (4) if there is no released second physical storage area in the previously used first physical storage areas, selects the first physical storage area at the head of each first physical storage area connected to unallocated queues, selects the first second physical storage area in the first physical storage area, and makes it correspond to the virtual storage area corresponding to the write request.

By a third perspective, with reference to the first perspective, multiple RAID groups are installed, and the control unit makes each first physical storage area included in each RAID group correspond to the virtual volumes in the specified order for the RAID groups to be evenly used.

By a fourth perspective, with reference to the third perspective, the control unit, (1) when formatting each first physical storage area included in each RAID group, connects each first physical storage area included in each RAID group to an unallocated queue in the specified order or, (2) if using a previously formatted first physical storage area, selects the first physical storage area at the head of each first physical storage area connected to the unallocated queue.

By a fifth perspective, with reference to the third perspective, an unallocated queue is prepared for each RAID group in advance, the control unit, (1) when formatting each first physical storage area included in each RAID group, connects each first physical storage area in each RAID group to the unallocated queue corresponding to each RAID group or, (2) if using a previously formatted first physical storage area, selects and uses each first physical storage area connected to each unallocated queue in the specified order.

By a sixth perspective, with reference to the first perspective, the control unit, when creating virtual volumes, makes the correspondence of each virtual storage area in the virtual volumes to another specified second physical storage area.

By a seventh perspective, with reference to the sixth perspective, the control unit, when receiving a write request, changes the correspondence destination of the virtual storage area corresponding to the write request from another specified second storage area to the specified second physical storage area.

By an eighth perspective, with reference to the first perspective, the control unit makes the unused second physical storage area next to the second physical storage area corresponding to the virtual volume corresponding to the previous write request correspond to the virtual volume as the specified second physical storage area.

By a ninth perspective, with reference to the eighth perspective, the control unit is, when receiving a release command for releasing the second physical storage area corresponding to the virtual volume, supposed to release the second physical storage area specified by the release command. Furthermore, the control unit, if there is no unused second physical storage area, makes the second physical storage area released by the release command from each second physical storage area included in the currently used first physical storage area correspond to the virtual volume as the specified second physical storage area.

By a tenth perspective, with reference to the ninth perspective, the control unit, if there is no released second physical storage area in the currently used first physical storage area, selects the second physical storage area released by the release command from the second physical storage areas included in the previously used first physical storage areas used before the currently used first physical storage area and makes it correspond to the virtual volume as the specified second physical storage area.

By an eleventh perspective, with reference to the tenth perspective, the control unit, if there is no released second physical storage area in the previously used first physical storage areas, selects a first physical storage area from unused first physical storage areas, and makes the first second physical storage area in the first physical storage area correspond to the virtual volume as the specified second physical storage area.

By a twelfth perspective, with reference to the first perspective, the storage control device comprises multiple virtual volumes, other RAID groups different from the RAID group and managed by sequence numbers with the RAID group, and normal logical volumes created based on the other RAID groups and managed by sequence numbers with the virtual volumes, and the control unit in the storage control device, when receiving a write request related to the normal logical volumes, has write data written to the storage areas of the other RAID groups.

By a thirteenth perspective, with reference to the first perspective, in the data stored in the virtual volumes, a guarantee code is set for each specified size, and the guarantee code includes data for identifying the RAID group, data for identifying the first physical storage area, and data for identifying the second physical storage area in the first physical storage area.

A control method of virtual volumes according to a fourteenth perspective is a method for controlling virtually created virtual volumes including multiple virtual storage areas, and the control method comprises creating a pool unit for managing multiple first physical storage areas which are created in stripes across multiple storage devices configuring RAID groups and including multiple second physical storage areas corresponding to the virtual storage areas, formatting each first physical storage area, creating virtual volumes by making the correspondence of each virtual storage area to a second physical storage area for an initial setting included in a specified first physical storage area among the formatted first physical storage areas, connecting the virtual volumes to a host computer and, when receiving a write request from the host computer to the virtual volumes, inhibits the correspondence of multiple virtual volumes to a first physical storage area, making the correspondence of the specified second physical storage area included in the specified first physical storage area among the formatted first physical storage areas to the virtual storage area corresponding to the write request, and storing the write data received from the host computer in the specified second physical storage area corresponding to the virtual storage area.

At least one part of this invention can be configured as a computer program. This computer program can be fixed into storage media and distributed, or delivered via a communication network.

BRIEF DESCRIPTION OF DRAWINGS

FIGS. 24 (24(a) and 24(b)) is a diagram showing the effects of this invention.

FIG. 28 is a diagram showing the queues for managing the chunks used by the storage control device related to the third embodiment.

REFERENCE SIGNS LIST

Figure 1:
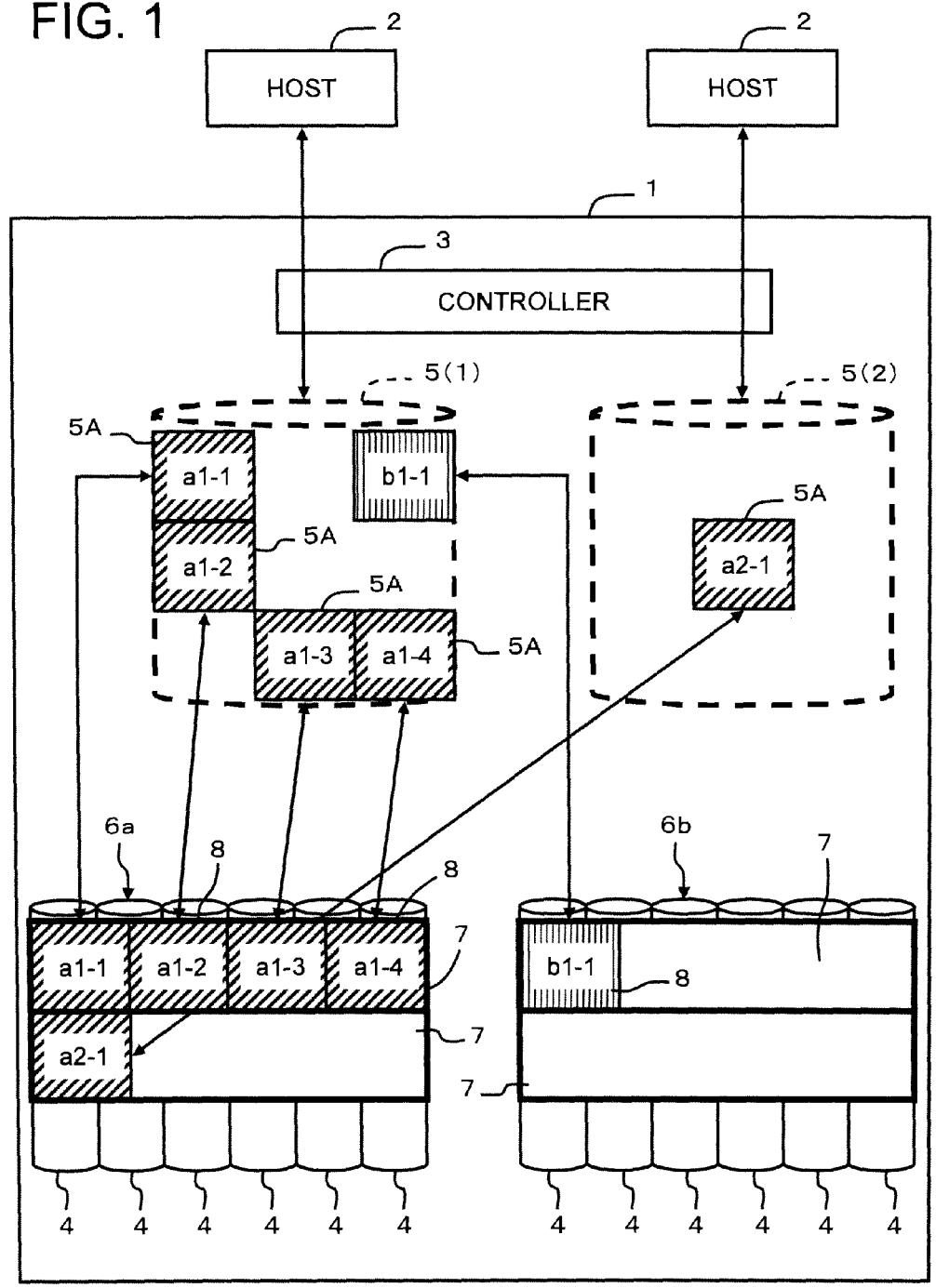
FIG. 1 is a diagram showing the overall concept of an embodiment of this invention.

1: storage control device, 2: host, 3: controller, 4: storage device, 5(1) and 5(2): virtual volume, 5A: virtual storage area, 6a and 6b: RAID group, 7: chunk, 8: page, 10: storage control device, 20: host, 30: controller, 40: storage device, 50V: virtual volume, 50N: normal volume, 60: pool unit, 70: management server, 90: RAID group, 91: chunk, and 92: page.

DESCRIPTION OF EMBODIMENTS

The embodiments of this invention are described below with reference to the attached figures. An overview of the invention is described first, and then the embodiments are described. As described later, this invention allocates physical storage areas to virtual volumes 5 in units of chunks 7. A chunk 7 consists of multiple pages 8. One chunk 7 is made to correspond to one virtual volume 5. That is, one chunk 7 is not supposed to correspond to different multiple virtual volumes 5. This enables the efficient use of storage areas in a chunk 7.

When creating a virtual volume 5, the correspondence of each virtual storage area 5A to a page 8 for the initial setting is made in advance. When a write request is issued from a host 2 to the virtual volume 5, the pages 8 in the chunk 7 are used serially and allocated to the virtual storage area 5A related to the write request. Write data is written to the allocated pages 8. When writing the data, the connection destination of the virtual storage area 5A related to the write request is changed from the page 8 for the initial setting to the specified page 8 in the chunk 7. The specified page 8 is the page next to the page used at the time of the previous write processing. That is, changing the page allocated to the virtual storage area 5A from the page 8 for the initial setting to the specified page 8 is all that is required to write data, which enables the improvement of the response performance of the virtual volume 5.

Furthermore, if there are no more blank pages 8 left in the chunk 7, a new chunk 7 is selected and allocated to the virtual volume 5. The new chunk 7 is selected from the chunks in another RAID group 6b. This enables load distribution between RAID groups 6a and 6b.

FIG. 1 is a diagram showing an overview of an embodiment of this invention. The description below related to FIG. 1 shows an overview of this invention to the extent required for the understanding and implementation of this invention, and the scope of this invention is not limited to the configuration shown in FIG. 1.

The system shown in FIG. 1 includes a storage control device 1 and a host or hosts 2. The hosts 2 are configured as computer systems such as a server computer or a mainframe computer. If a host 2 is a host computer, data communications are carried out in accordance with a communication protocol, such as FICON (Fibre Connection: Trademark), ESCON (Enterprise System Connection: Trademark), ACONARC (Advanced Connection Architecture: Trademark), or FIBARC (Fibre Connection Architecture: Trademark). If a host 2 is a server computer, data communications are carried out in accordance with a communication protocol, such as FCP (Fibre Channel Protocol) or iSCSI (internet Small Computer System Interface).

The storage control device 1 is connected to the hosts 2 via a communication network. The storage control device 1 includes, for example, a controller 3, storage devices 4, virtual volumes 5(1) and 5(2), which are hereinafter referred to as virtual volumes 5 unless specifically required to be distinguished. Each of two RAID groups 6a and 6b consists of multiple storage devices 4.

For storage devices 4, various types of devices capable of reading and writing data, such as hard disk devices, semiconductor memory devices, optical disk devices, magnetic optical disk devices, magnetic tape devices, flexible disk devices, and others, are available.

If hard disk devices are used as storage devices 4, for example, FC (Fibre Channel) disks, SCSI (Small Computer System Interface) disks, SATA disks, ATA (AT Attachment) disks, SAS (Serial Attached SCSI) disks, and others can be used. Storage devices 4 such as flash memory, FeRAM (Ferroelectric Random Access Memory), MRAM (Magnetoresistive Random Access Memory), Ovonic Unified Memory, RRAM (Resistance RAM), and others can also be used. Furthermore, for example, a configuration mixing different types of storage devices 4, such as flash memory devices and hard disk drives, may also be permitted.

The physical storage areas included in the RAID groups 6a and 6b are separated into multiple chunks 7 in stripes. Each chunk 7 consists of serial multiple pages 8. The chunks 7 correspond to "first physical storage areas" and the pages 8 correspond to "second physical storage areas." For better understanding, a reference sign "a1" is given to the first chunk 7 belonging to one RAID group 6a, and a sequence number is given to each page belonging to the first chunk 7 (a1). The same reference is applied to the other RAID group 6b. Therefore, for example, "a2-3" means the third page in the second chunk of the RAID group 6a while "b1-1" means the first page in the first chunk of the RAID group 6b.

A virtual volume 5 consists of multiple virtual storage areas 5A. The size of a virtual storage area 5A is the same as that of a page 8. For example, the size of a page 8 is SZ1 byte (32 MB, for example), the size of a chunk 7 is SZ2 byte (1 GB, for example), and the size of a virtual volume 5 is SZ3 byte (10 GB, for example). In this case, a virtual volume 5 consists of N1 units (10 units, for example) of chunks 7, and a chunk 7 consists of N2 sheets (32 sheets, for example) of pages 8. The above-mentioned numeric values in the parentheses are merely examples for understanding, and the scope of this invention is not limited to the above-mentioned numeric values. The above-mentioned page size, the chunk size, the virtual volume size, and others can be set variably.

The controller 3 controls the operations of the storage control device 1. For example, the controller 3, with reference to the commands from the user, makes the storage control device 1 create RAID groups 6a and 6b and virtual volumes 5. The controller 3 also performs the processing in response to the commands (read commands and write commands) issued from the hosts 2, and transmits the processing result to the hosts 2.

Furthermore, the controller 3, when receiving a write command, determines whether a page 8 is allocated to the virtual storage area 5A specified by the write command or not. If no page 8 is allocated to the specified virtual storage area 5A, the controller 3 allocates the specified page 8 in the chunk 7 to the specified virtual storage area 5A. The controller 3 writes the write data in the specified allocated page 8.

The controller 3 controls page allocation for only one virtual volume 5 to be allocated to one chunk 7. The pages 8 included in one chunk 7 are allocated to only one virtual volume 5. The pages 8 to be allocated to multiple different virtual volumes 5 are not included in one chunk 7. In one chunk 7, regardless of the logical address value, serial pages 8 are used.

To describe one virtual volume 5(1) as an example, in response to the initial write command, the head page 8 (a1-1) in the chunk 7 (a1) is used, the next page 8 (a1-2) following the head page 8 (a1-1) is used for the next write command and, for another write command, the next page 8 (a1-3) is used. If another write command is received after using the last page 8, a new chunk 7 (b1) is allocated to the virtual volume 5(1).

To the other virtual volume 5(2), the head page 8 (a2-1) in the second chunk 7 of the RAID group 6a is allocated. If a new write command is issued for the virtual volume 5(2), the next page 8 is allocated to the virtual volume 5(2). The numeral sign such as "a2-2" which should be allocated to the page 8 is omitted from FIG. 1.

In this embodiment configured as mentioned above, physical storage areas in units of chunks 7 including multiple pages 8 are allocated to virtual volumes 5 and, at the same time, one chunk 7 is allocated to only one virtual volume 5. Therefore, as described later, the storage areas in the chunks 7 can be efficiently utilized. It is also possible to manage the virtual volumes 5 in the same way as normal logical volumes and simplify the control structure.

This embodiment, for the purpose of using multiple RAID groups 6a and 6b evenly, selects chunks 7 (a1) and 7 (b1) from the RAID groups 6a and 6b respectively, and allocates them to the virtual volume 5(1). By doing this, the load of the RAID groups 6a and 6b can be equalized. The details of this embodiment are described below.

Example 1

Figure 2:
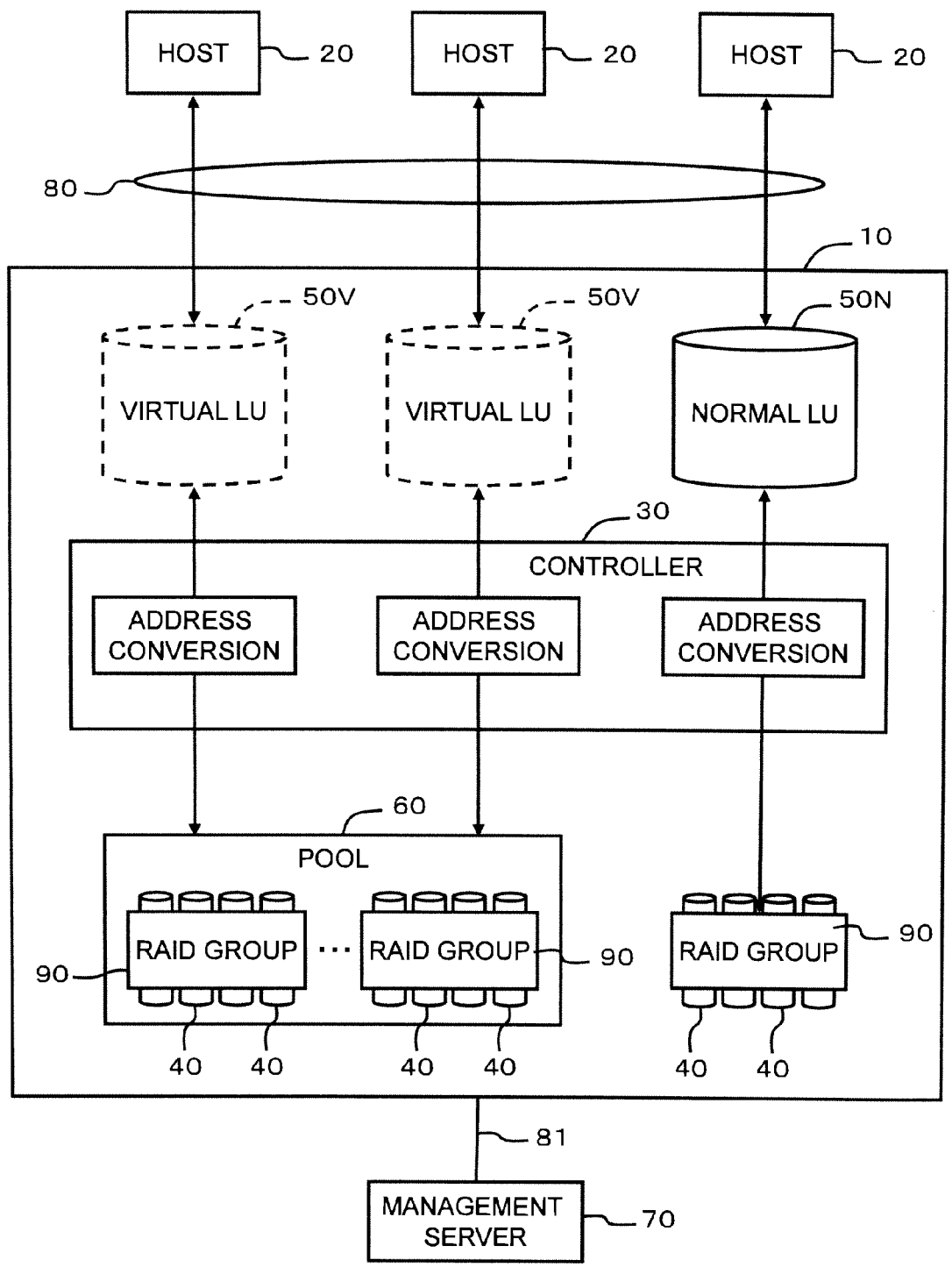
FIG. 2 is a schematic view showing the entire configuration of the system including the storage control device.

FIG. 2 is a schematic view showing the entire configuration of the information processing system including the storage control device 10 related to this example. This information processing system can be configured of, for example, at least one storage control device 10, one or more hosts 20, and at least one management server 70.

The correspondence relationship with the embodiment described with reference to FIG. 1 is described below. The storage control device 10 corresponds to the storage control device 1, a host 20 to a host 2, a controller 30 to the controller 3, a storage device 40 to the storage devices 4, virtual volumes 50V to the virtual volumes 5, and RAID groups 90 to the RAID groups 6a and 6b, respectively. The description overlapping with FIG. 1 is omitted as much as possible.

The hosts 20 and the storage control device 10 are connected to each other via a first communication network 80. The first communication network 80 is configured as, for example, FC-SAN (Fibre Channel-Storage Area Network) or IP-SAN (Internet Protocol-SAN).

The management server 70 is a device for changing the settings of the storage control device 10 and performing other operations. The management server 70 is connected to the storage control device 10 via a second communication network 81 such as a LAN (Local Area Network). Note that a configuration in which the settings of the storage control device 10 can be changed from a host 20 by installing the storage management function in the host 20 may also be permitted.

The storage control device 10, the details of which are described later, includes virtual volumes 50V and normal volumes 50N. Note that the figures refer to logical volumes as "LUs." LU is the abbreviation of Logical Unit.

A virtual volume 50V is, as shown in FIG. 2, a virtually created logical volume to which storage areas are allocated in response for write commands from a host 20. That is, as for a virtual volume 50V, the size of the volume provided to the host 20 does not match the size of an actual storage area. A normal volume 50N is a volume created in accordance with the storage areas included in a RAID group 90.

A pool unit 60 manages the storage areas included in multiple RAID groups 90. The storage areas managed by the pool unit 60 are allocated to the virtual volumes 50V in units of chunks 91 (refer to FIG. 4).

The controller 30 writes data in the storage device 40 by converting the logical addresses of the volumes 50V and 50N into physical addresses of RAID groups 90 or by other methods, or transmits data to the hosts 20 by converting the physical addresses of the data read from the storage device 40 into logical addresses or by other methods.

Figure 3:
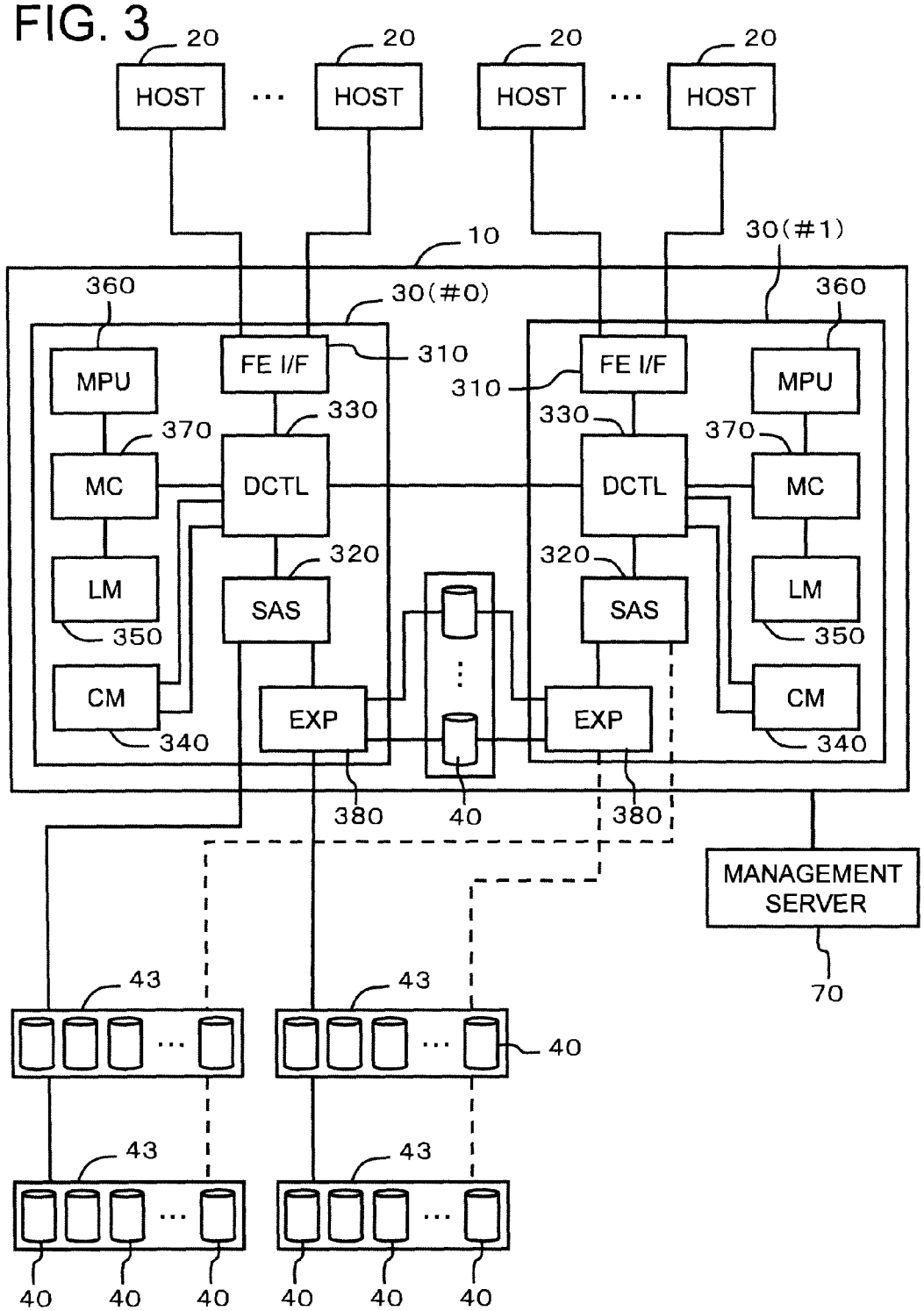
FIG. 3 is a block diagram of the controller.

FIG. 3 is a block diagram showing the configuration of the controller 30. To the storage control device 10, multiple additional chassis 43 can be connected. Each additional chassis 43 includes multiple storage devices 40. The user, if necessary, can increase the total storage capacity of the system by connecting additional chassis 43.

The storage control device 10 includes multiple controllers 30 (#0) and 30 (#1). Even if either of the controllers 30 has stopped its operation due to a failure or other causes, the operation can be continued by the other controller 30. They are hereinafter referred to as controllers 30 unless specifically required to be discriminated from each other.

The controller 30, for example, includes a first communication circuit 310 (FE I/F in the figure), a second communication circuit 320 (SAS in the figure), a data transfer control circuit 330 (DCTL in the figure), a cache memory 340 (CM in the figure), a local memory 350 (LM in the figure), a microprocessor 360 (MPU in the figure), a memory controller 370 (MC in the figure), and an expander 380 (EXP in the figure).

The first communication circuit 310 is a control circuit for performing the communication with hosts 20. The second communication circuit 320 is a control circuit for performing the communication with the storage devices 40. The data transfer control circuit 330 is a circuit for controlling the flow of data in the storage control device 10. The data transfer control circuits 330 are connected to each other. The cache memory 340 stores, for example, write data received from the host 20 and data read from the storage devices 40. Furthermore, the cache memory 340 occasionally stores management data and others for managing the configuration and operations of the storage control device 10.

The local memory 350 stores various types of data used by the microprocessor 360. The microprocessor 360 controls the operations of the storage control device 10, as described later, by reading computer programs from the storage devices 40 or the local memory 350 and executing them.

The memory controller 370 is a control circuit for connecting the microprocessor 360 to the local memory 350 and the data transfer circuit 330. The expander 380 is a circuit for expanding the communication port of the second communication circuit.

Figure 4:
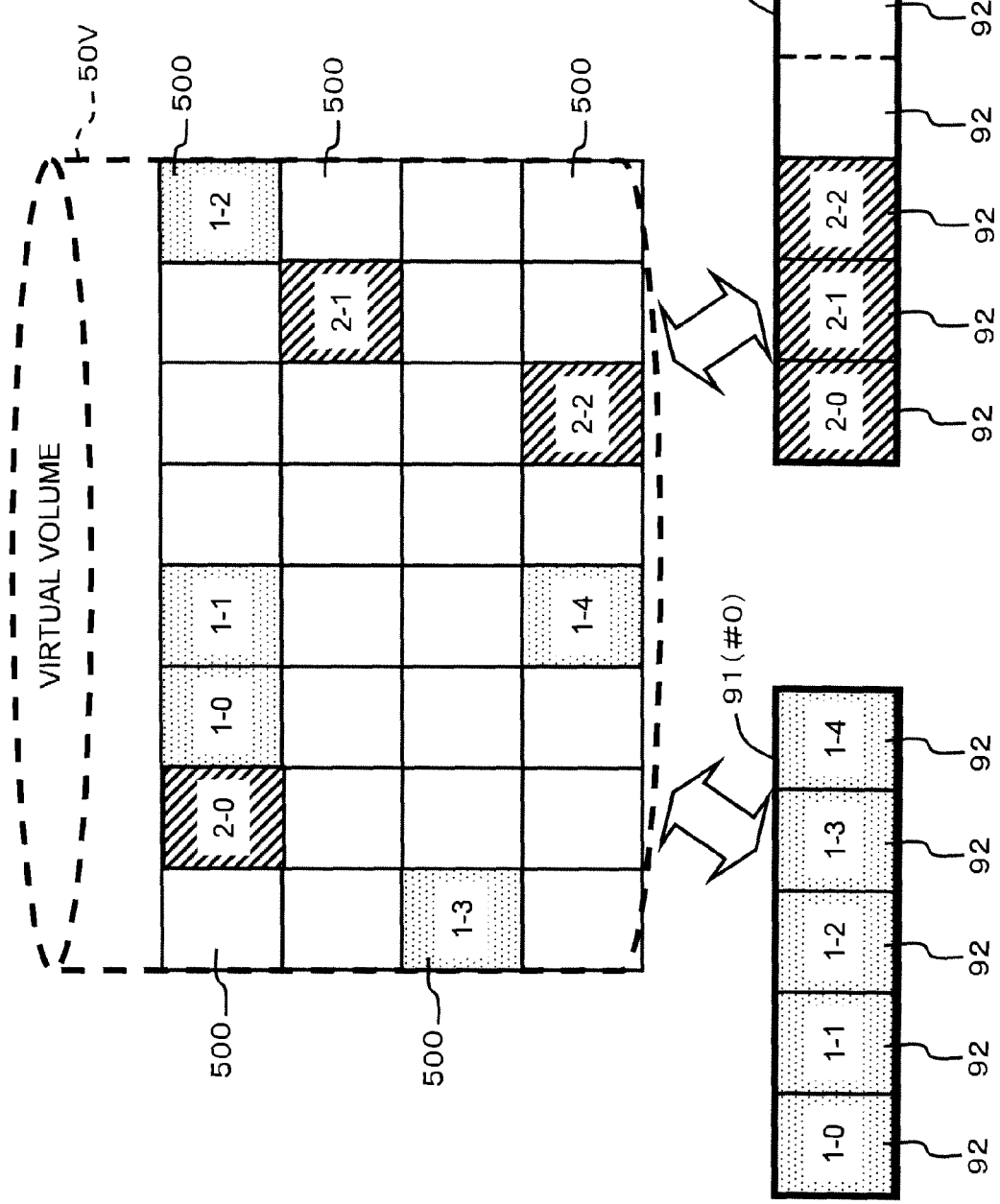
FIG. 4 is a schematic view showing the relation among virtual volumes, chunks and pages.

FIG. 4 is a diagram showing the relationship between a virtual volume 50V and chunks 91. The virtual volume 50V includes multiple virtual storage areas 500. Each of the chunks 91 includes multiple pages 92. Though FIG. 4 conveniently shows the pages 92 as if they vertically separate striped chunks 91, the pages 92 are actually formed following the stripes.

It is assumed that, in FIG. 4, the first chunk 91 (#0) is allocated to the virtual volume 50V. Each time a write command (write request) for the virtual volume 50V is received, a page 92 in the first chunk 91 (#0) is serially selected, and the correspondence is made with the virtual storage area 500 corresponding with the write command. The write data is written in the page 92 corresponding with the virtual storage area 500. That is, the write data is written in each storage area of the storage devices 40 configuring the page 92.

It is assumed that the first page 92 (1-0) of the first chunk 91 (#0) is used, then the next page 92 (1-1) is used, another page 92 (1-2) is used, and even the last page 92 of the first chunk 91 (#0) is used. This represents that all the pages in the first chunk 91 (#0) are used.

If a new write command is issued from the host 20, the second chunk 91 (#1) is selected, and the head page 92 (2-0) of the second chunk 91 (#1) is used. After that, as described for the first chunk 91 (#0), the pages 92 in the second chunk 91 (#1) are serially used.

As mentioned above, for the virtual volume 50V, the correspondence with multiple chunks 91 (#0) and 91 (#1) is made. Those chunks 91 (#0) and 91 (#1) are selected from separate RAID groups 90 respectively. That is, for the virtual volume 50V, the correspondence with multiple chunks 91 selected from multiple RAID groups 90 is made. In accordance with data write in the virtual volume 50V by the host 20, the pages 92 in the corresponding chunk 91 are serially used.

As described later, if the host 20 demands the deletion of the data in the virtual volume 50V, the pages 92 corresponding with the logical addresses of the data to be deleted are released, and are used for storing other write data related to the virtual volume 50V.

Figure 5:
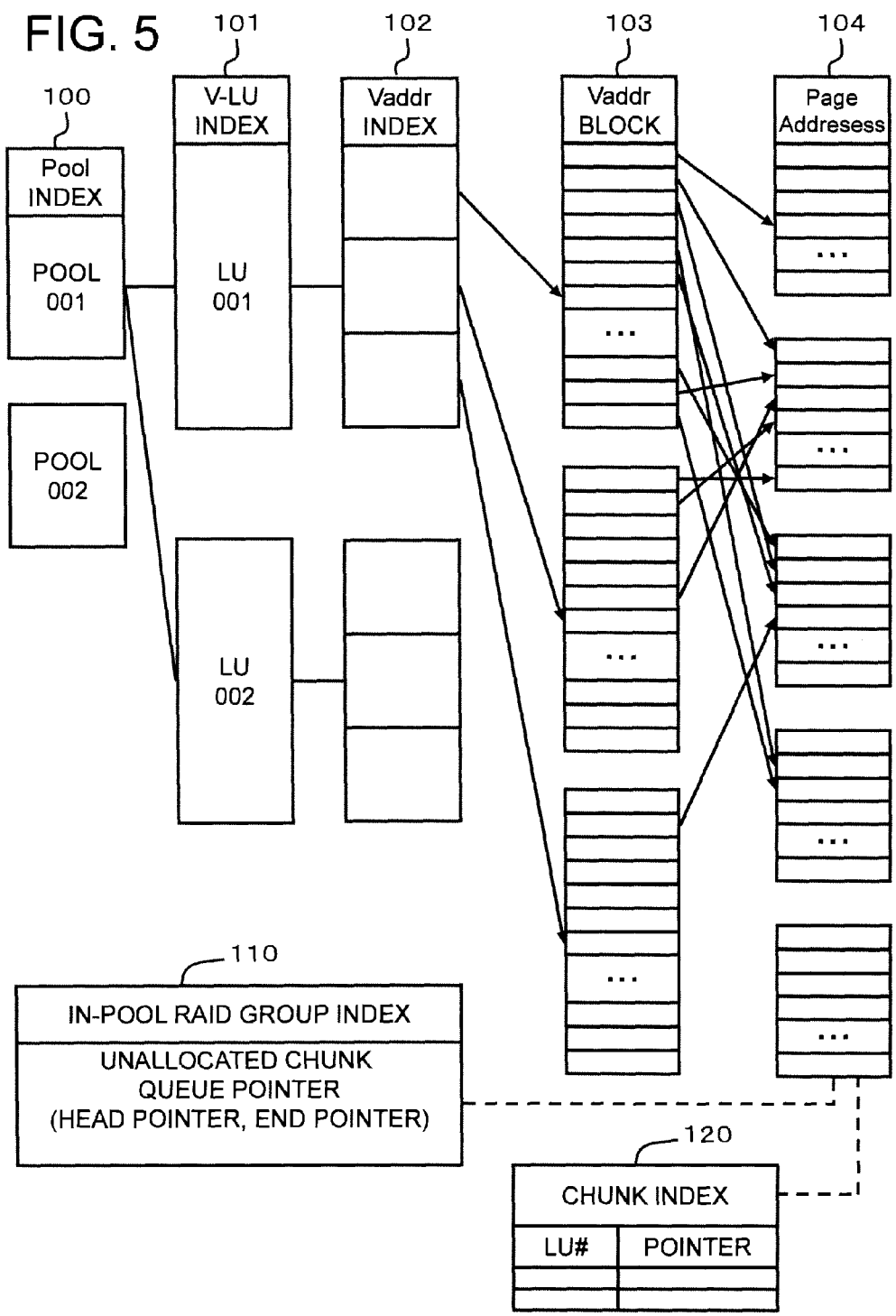
FIG. 5 is a diagram showing the tables for managing the chunks and pages allocated to the virtual volumes.

FIG. 5 is a diagram showing tables for managing the virtual volume 50V. The tables shown in FIG. 5 are created in the cache memory 340, and then stored in the specified management areas in the specified storage devices 40. Furthermore, those tables are copied to the local memory 350, and used by the microprocessor 360.

The pool index 100 is the information for managing the information related to the configuration of the pool unit 60 (including the status and the attributes) such as the identification numbers of the RAID groups 90 managed in the pool unit 60.

The virtual volume index 101 is the information for managing the information related to the configuration of the virtual volume 50V. The virtual volume index 101, for example, manages the information such as the identification numbers of the chunks 91 allocated to the virtual volume 50V, the linked index 102, and others.

The virtual address index 102 is the information for managing the pointers for the virtual address block 103. The virtual address block 103 is the information for managing the pointers for the page address information 104.

For example, if the volume size of the virtual volume 50V is 10 GB, the virtual address index 102 manages the virtual address area of the virtual volume 50V divided into 4 GB of areas (the first two areas are 4 GB each and the last area is 2 GB). Each virtual address block 103 can cover a 4 GB area. As mentioned above, this embodiment performs the hierarchical management of the virtual address area included in the virtual volume 50V at two steps, i.e., by the virtual address index 102 and by the virtual address block 103. By this method, search in a specified range can be performed, which achieves immediate accesses to the relevant page 92. Note that the above-mentioned numeric values (4 GB, 10 GB, and 2 GB) are merely examples for description, and the scope of this invention is not limited to those numeric values. Each of the above-mentioned numeric values can be set variably.

The page address information 104 is the information for managing the configuration information of each virtual storage area 500 (i.e., virtual page 500) configuring the virtual volume 50V. The page address information 104 includes the physical addresses and the page status for the physical pages 92 corresponding with the virtual pages.

The in-pool RAID group index 110 is the information for managing the configuration information of each RAID group 90 managed in the pool unit 60. The in-pool RAID group index 110 manages, for example, the information of each chunk 91 included in each RAID group 90 in the pool unit 60 and other information. The in-pool RAID group index 110 also includes the pointers showing the head and the end of unallocated chunk queues.

The chunk index 120 includes pointers for managing the allocation status of chunks 91 in each virtual volume 50V. That is, the chunk index 120 manages the number of chunks allocated to each virtual volume 50V.

Figure 6:
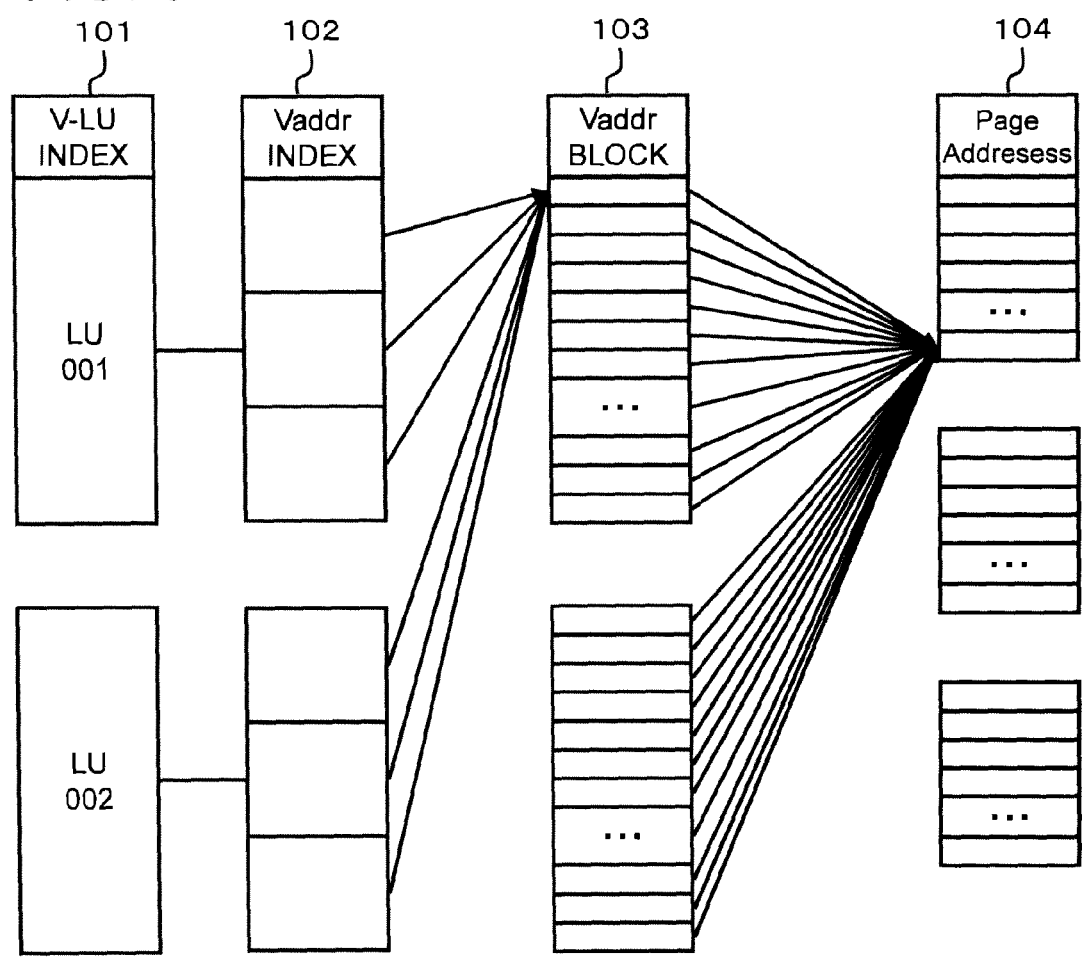
FIG. 6 is a diagram showing the connection of the tables when creating virtual volumes.

FIG. 6 shows the status in which the tables shown in FIG. 5 are initialized. When creating a virtual volume 50V, the tables are initialized as shown in FIG. 6. Each virtual storage area 500 (virtual page 500) included in the virtual volume 50V is mapped to a specific page 92 in a specific chunk 91.

For example, as shown in FIG. 6, the last page 92 of the head chunk 91 in the RAID group 90 is used as a specified page for initialization. In the head chunk 91, the management information of the above-mentioned tables and others is stored. The pages 92 from the head page 92 to the specified number in the head chunk 91 are used as the save area for the management information. Though depending on the number of settable virtual volumes and others, the total size of the management information is smaller than the size of the chunk size (1 GB, for example). Therefore, at least, the management information is not stored in the last page 92 of the head chunk 91. That is, the last page 92 of the head chunk 91 is not used as the storage destination of the management information.

Therefore, only zero data is stored in advance in the page 92 for initialization which is the last page of the head chunk 91. For initializing the tables for defining the configuration of a virtual volume 50V, the correspondence of all the virtual storage areas 500 in the virtual volume 50V with the pages 92 for initialization is made.

Figure 7:
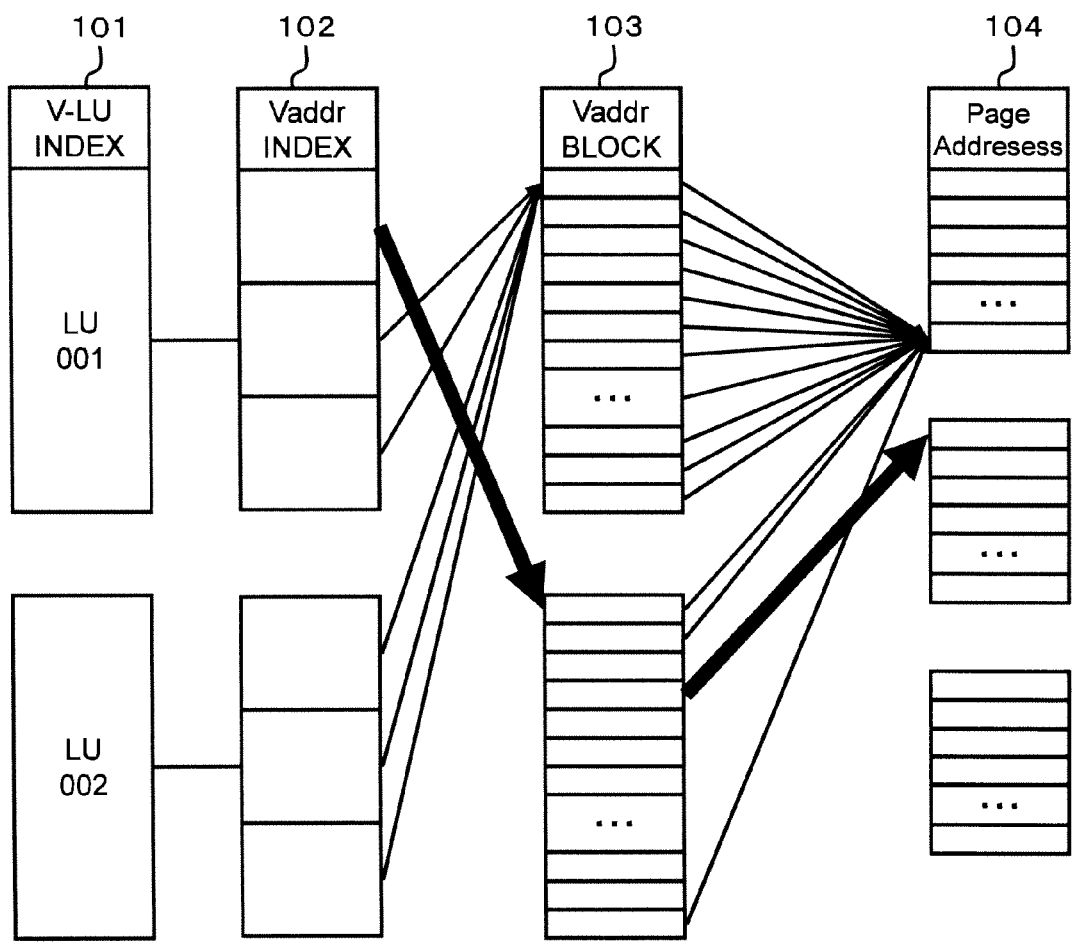
FIG. 7 is a diagram showing the process of, when writing write data, changing the page to be allocated to the virtual volume from the page for the initial setting to the specified page.

By this method, when defining a virtual volume 50V (when creating a virtual volume 50V), it can be confirmed in advance that no abnormality exists in mapping tables. Furthermore, as shown by heavy line arrows in FIG. 7, if a write command is issued for the virtual volume 50V, all that is required to do is to disconnect the virtual storage area 500 corresponding with the logical address specified by the write command from the page 92 for initial settings to be connected to the specified page for writing the write data. Therefore, by only changing the correspondence destination of the virtual storage area 500, write data can be stored, and the response performance of the virtual volume 50V can be improved.

Figure 8:
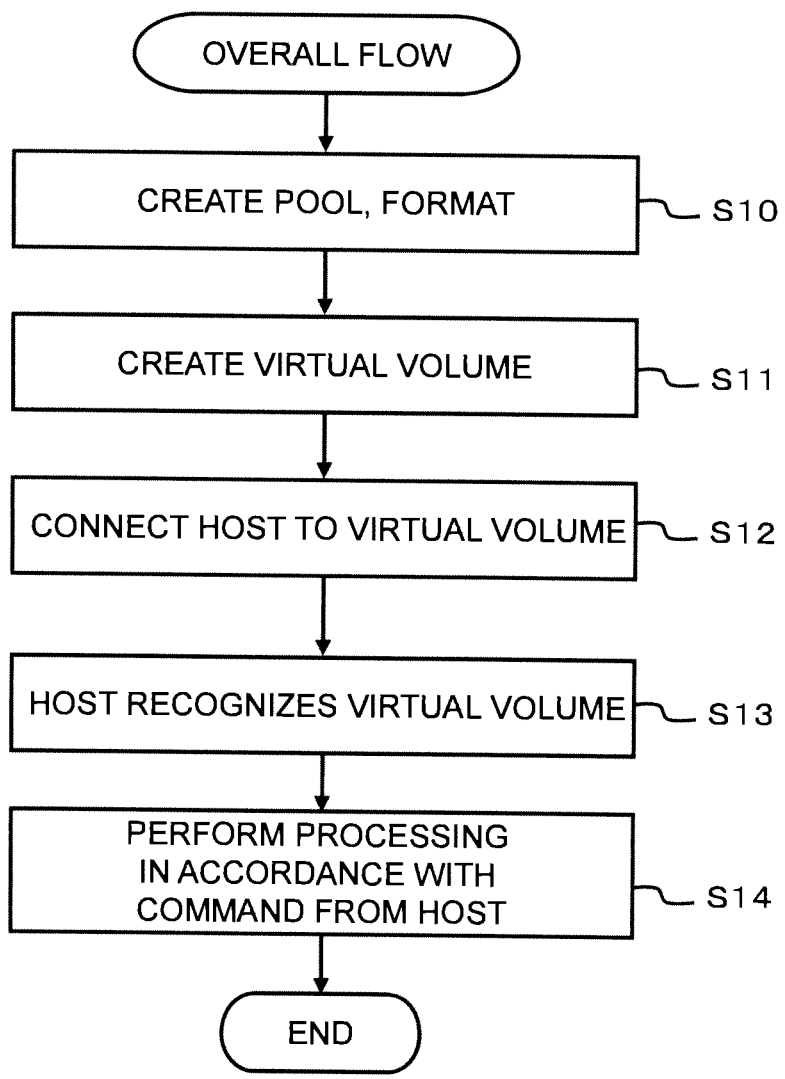
FIG. 8 is a diagram showing the flow of the entire operation of the storage control device.

FIG. 8 is a flowchart for the understanding of the entire operation of the storage control device 10. This flowchart includes the procedures by a user. Firstly, the user makes the pool unit 60 create a RAID group 90 by issuing a specific command to the storage control device 10 via the management server 70, format the RAID group 90, and create unallocated chunk queues and others (S10). At this point, the RAID groups 90 for the virtual volume 50V and the RAID groups 90 for the normal volume 50N managed in the pool unit 60 are managed by sequence numbers.

Next, the user makes the storage control device 10 create a virtual volume 50V by issuing another specified command to the storage control device 10 from the management server 70 (S11). As mentioned above, when creating a virtual volume 50V, the correspondence of each virtual storage area 500 with the page 92 for initial settings is made. At this point, the virtual volume 50V and the normal volume 50N are managed by sequence numbers. As mentioned above, the virtual volume 50V and the normal volume 50N can be managed by the common management method, and the virtual volume 50V and the normal volume 50N can be mixed in a storage control device 10.

Next, the user connects the host 20 and the virtual volume 50V (S12). The user connects the virtual volume 50V to the LUN (Logical Unit Number) linked to the host 20, and makes the registration to the WWN (World Wide Name) and others.

The host 20 recognizes the virtual volume 50V (S13), and issues a command such as a write command to the virtual volume 50V. The storage control device 10 performs the processing in accordance with the command from the host 20, and transmits the result to the host 20 (S24). The details of each processing are described below.

Figure 9:
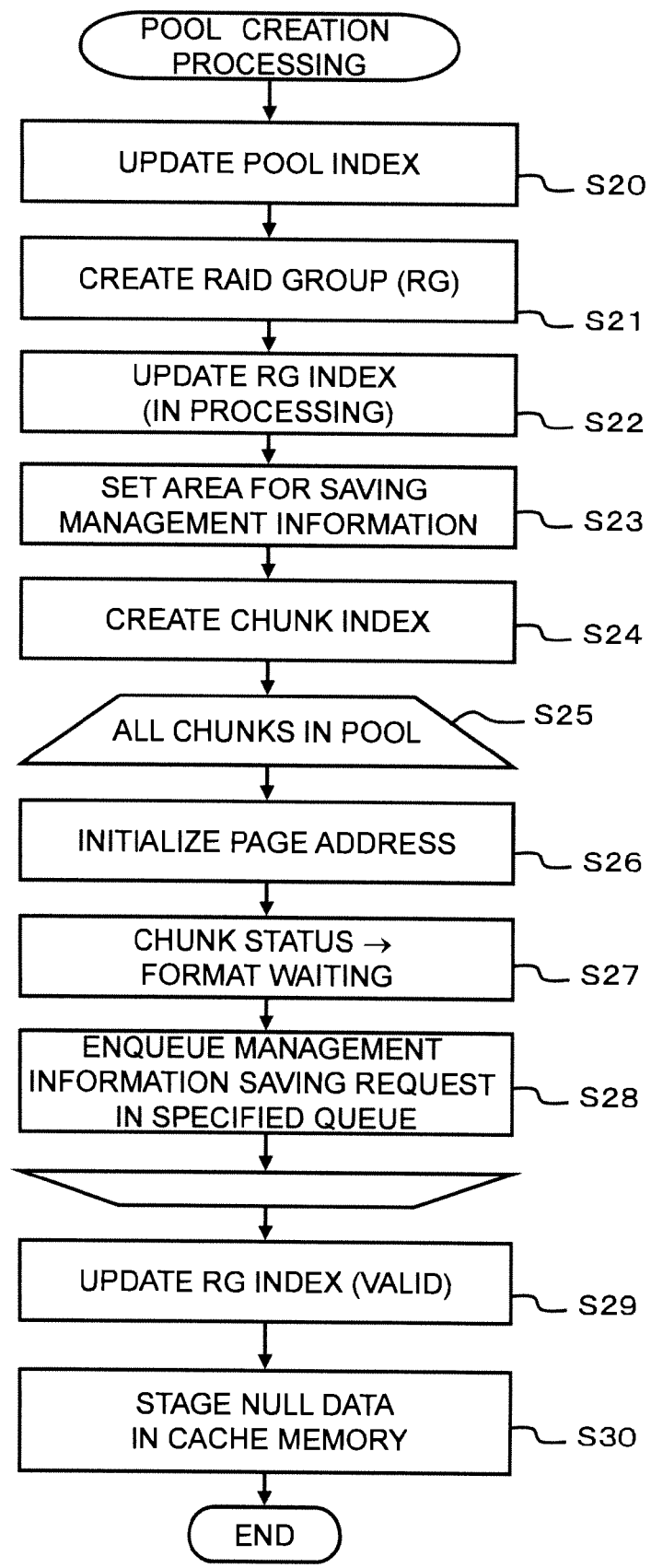
FIG. 9 is a flowchart showing the pool creation processing.

FIG. 9 is a flowchart showing the pool creating processing. The flowcharts described below show an overview of each processing. The replacement, modification, or deletion of the illustrated steps or the addition of new steps may be made by those skilled in the art.

The processing shown in FIG. 9 is started if a pool creation request is made. The subject of the operation is hereinafter referred to as a controller 30. The controller 30, for the pool index 100 of the pool unit 60 to be created, updates the pool status (S20) and creates the RAID group 90 (S21). The controller 30 changes the status of the in-pool RAID group index 110 to "in processing." (S22).

The controller 30 sets the area for saving the management information in the RAID group 90 (S23), and further creates the chunk index 120 (S24). For all the chunks 91 in the pool unit 60, the steps from S26 to S28 below are executed (S25).

The controller 30 initializes the page address information 104 corresponding with the target chunk (S26), changes the status of the target chunk to "Waiting to format" (S27). The controller 30 enqueues the management information save request in a save request queue for saving the management information (S28).

After performing the steps S26 to S28 for each chunk 91, the controller 30 changes the status of the in-pool RAID group index 110 to "Valid" (S29). The controller 30 stages null data in the cache memory 340 (S30), and completes this processing. This is intended for, if a data read from the virtual storage area 500 in which no write data is written is required, returning null data to the host 20 without accessing the page 92 which is the physical storage area.

Figure 10:
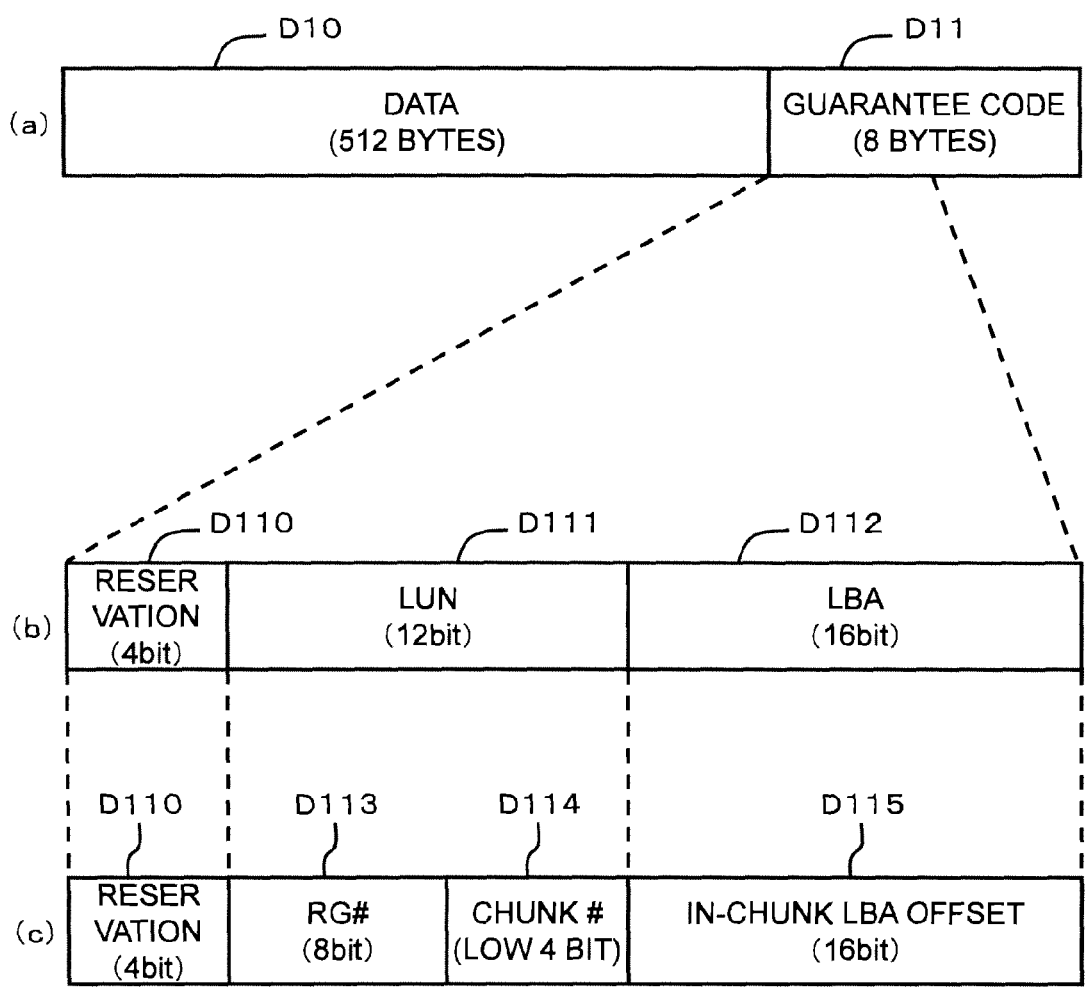
FIG. 10 (10(a) to 10(c)) is a diagram showing the configuration of a guarantee code added to data.

FIGS. 10 (10(a) to 10(c)) is a diagram for describing data and guarantee codes. As shown in FIG. 10(a), in this embodiment, for example, an 8-byte guarantee code D11 is added to each 512-byte data D10 and stored in the storage device 40. The guarantee code D11 can include a part for examining the logical address and a part for examining bit errors. The description below focuses on the part for examining the logical address.

FIG. 10(b) shows the configuration of a guarantee code added to the data stored in a normal volume 50N. In the guarantee code related to the normal volume 50N, the part used for examining the logical address includes a 4-bit reservation area D110, a 12-bit LUN area D111, and a 16-bit LBA area D112. LBA is the abbreviation of Logical Block Address. The LUN area D111 stores the LUN corresponding with the normal volume 50N. The LBA area D112 stores the logical address of the data D10.

FIG. 10(c) shows the configuration of a guarantee code added to the data stored in a virtual volume 50V. In the guarantee code related to the virtual volume 50V, the part used for examining the logical address includes a 4-bit reservation area D110, an 8-bit RAID group identification area D113, a 4-bit chunk identification area D114, and a 16-bit in-chunk LBA offset area D115. The RAID group identification area D113 stores the information (number in the figure) for identifying the RAID group 90. The chunk identification area D114 stores the low 4 bits among the information (number in the figure) for identifying the chunk 91. The in-chunk LBA offset area D115 stores the offset value from the head of the logical address of the chunk 91 in the chunk 91 storing the data D10.

Figure 11:
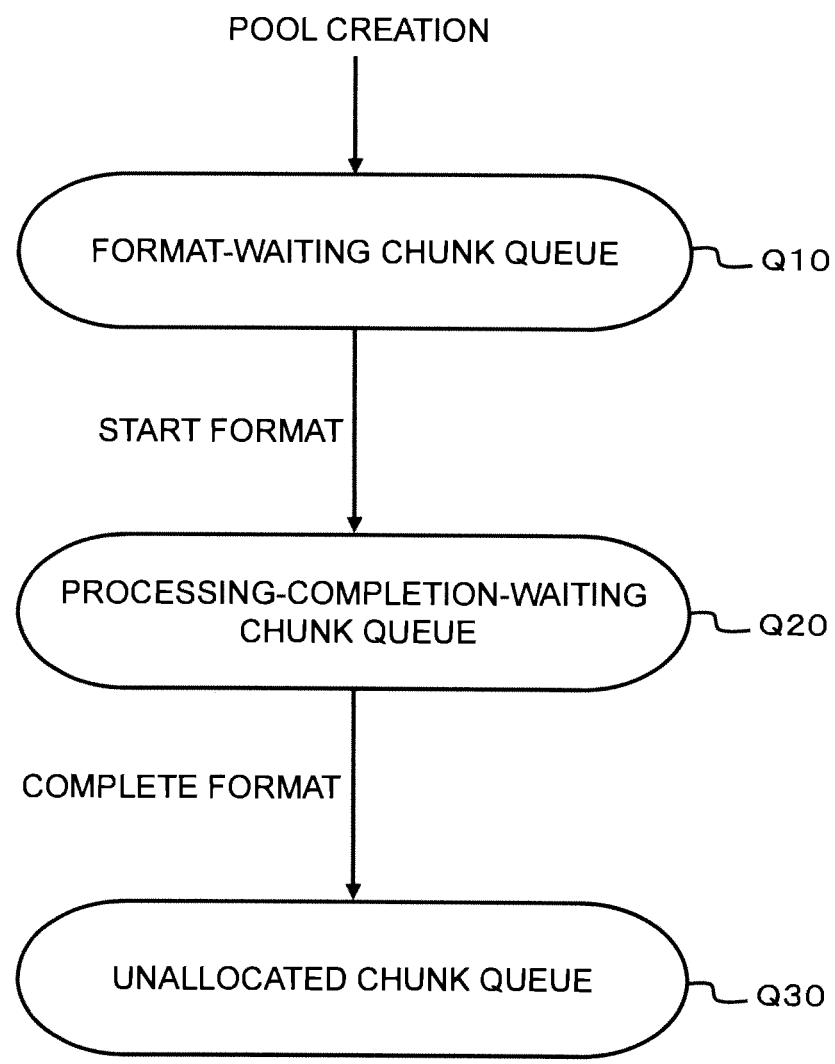
FIG. 11 is a diagram showing the status transition of a chunk.

The queues for managing the chunk 91 are described below with reference to FIGS. 11 and 12. FIG. 11 is the diagram showing the usage of the queues. When a pool unit 60 is created, each chunk 91 included in each RAID group 90 managed by the pool unit 60 is registered to the format-waiting chunk queue Q10 and managed. When the formatting is started, the chunk 91 being formatted is shifted to the processing-completion-waiting chunk queue Q20. After the formatting is completed, the formatted chunk 91 is shifted to the unallocated chunk queue Q30.

Figure 12:
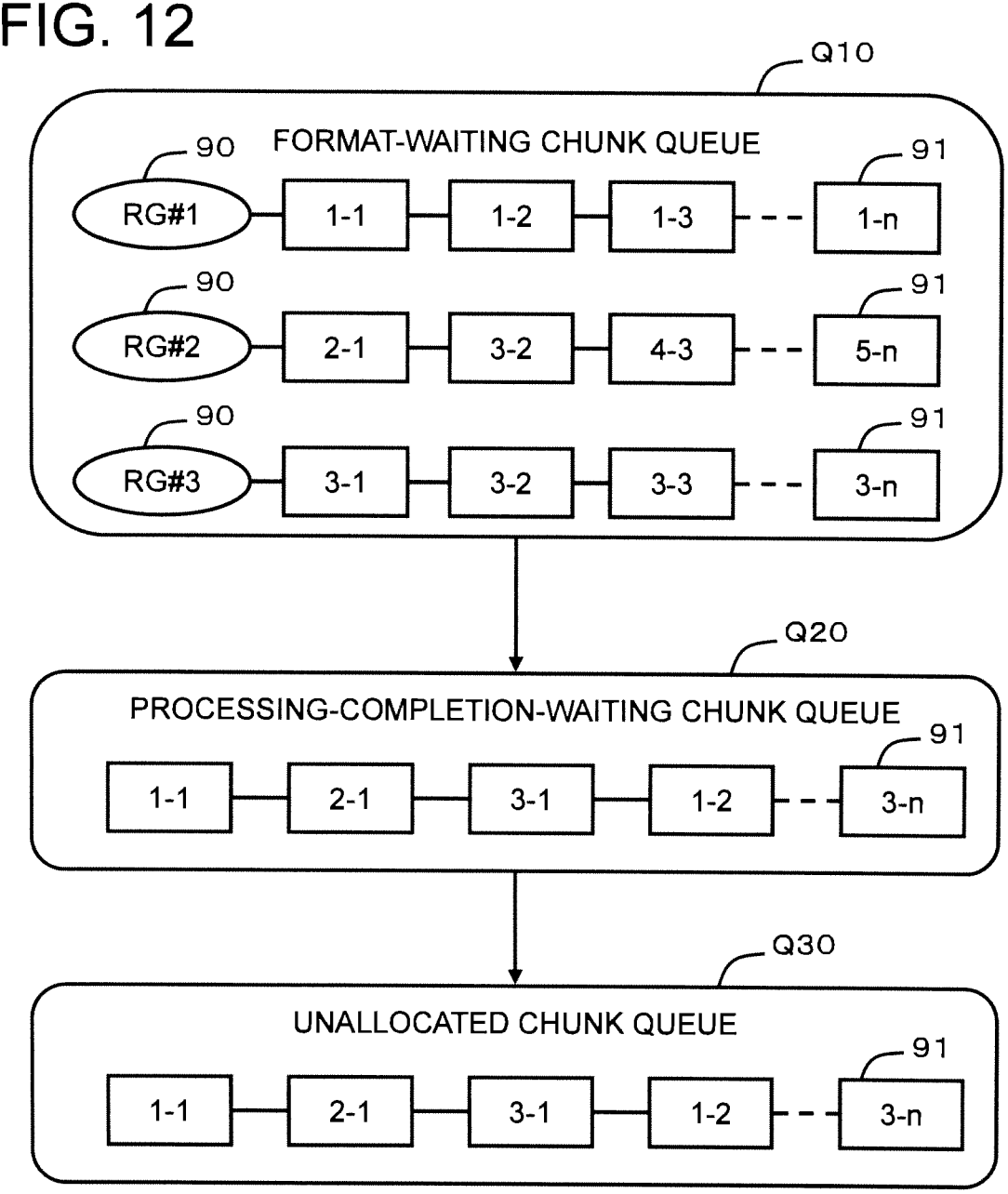
FIG. 12 is a diagram showing the queues for managing chunks.

FIG. 12 is a schematic view showing the queues Q10, Q20, and Q30. The format-waiting chunk queue Q10 is prepared for each RAID group 90. For starting the format processing, chunks 91 are removed from each RAID group 90 in the format-waiting chunk queue Q10 in the specified order, and connected to the processing-completion-waiting queue Q20. The formatted chunk 91 is, as mentioned above, connected to the unallocated chunk queue Q30. As the formatting is completed in order of the connection to the processing-completion-waiting chunk queue Q20, the order of the chunks 91 in the processing-completion-waiting queue Q20 normally matches the order of the chunks 91 in the unallocated chunk queue Q30.

Figure 13:
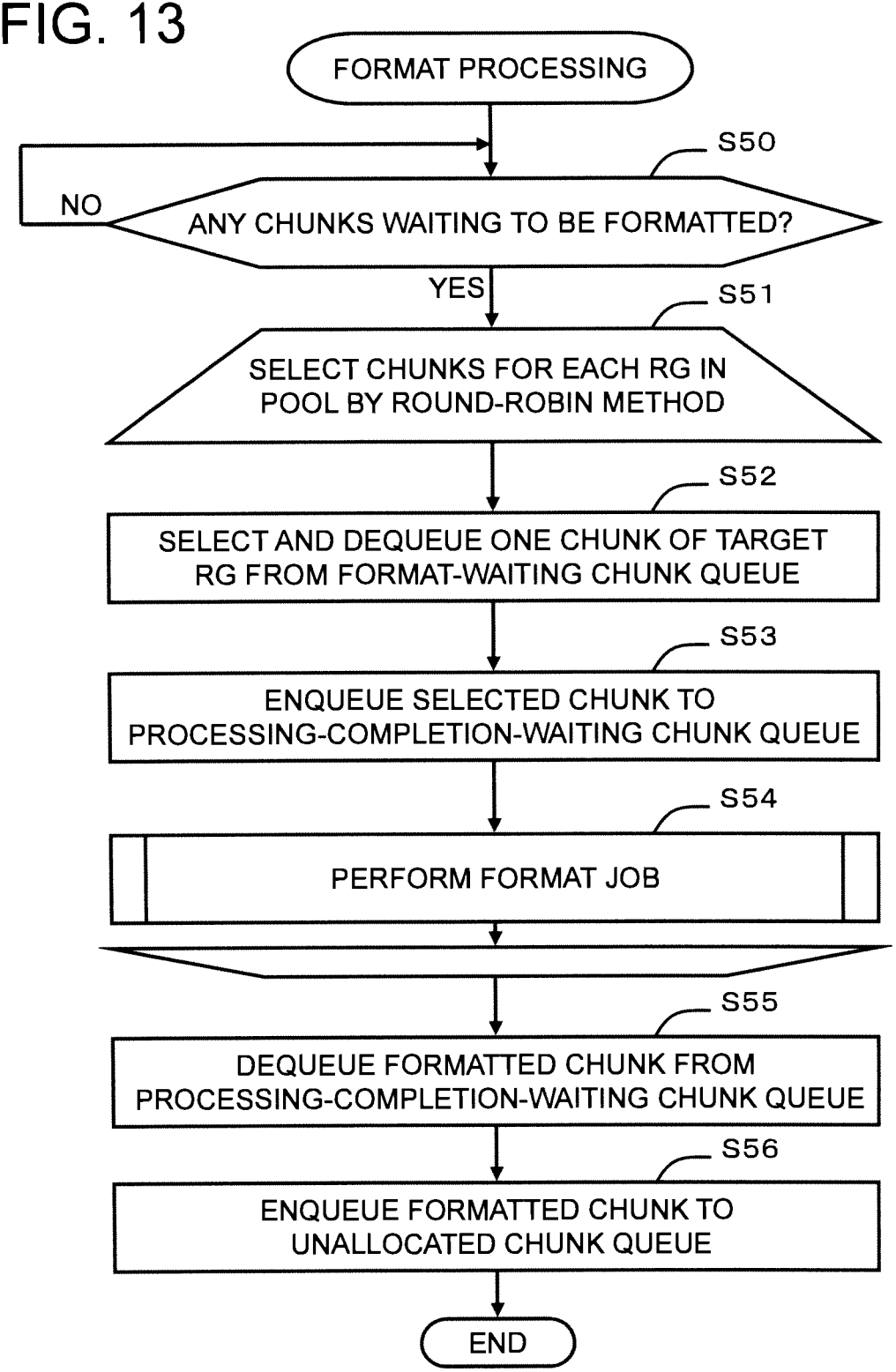
FIG. 13 is a flowchart showing the format processing.
Figure 14:
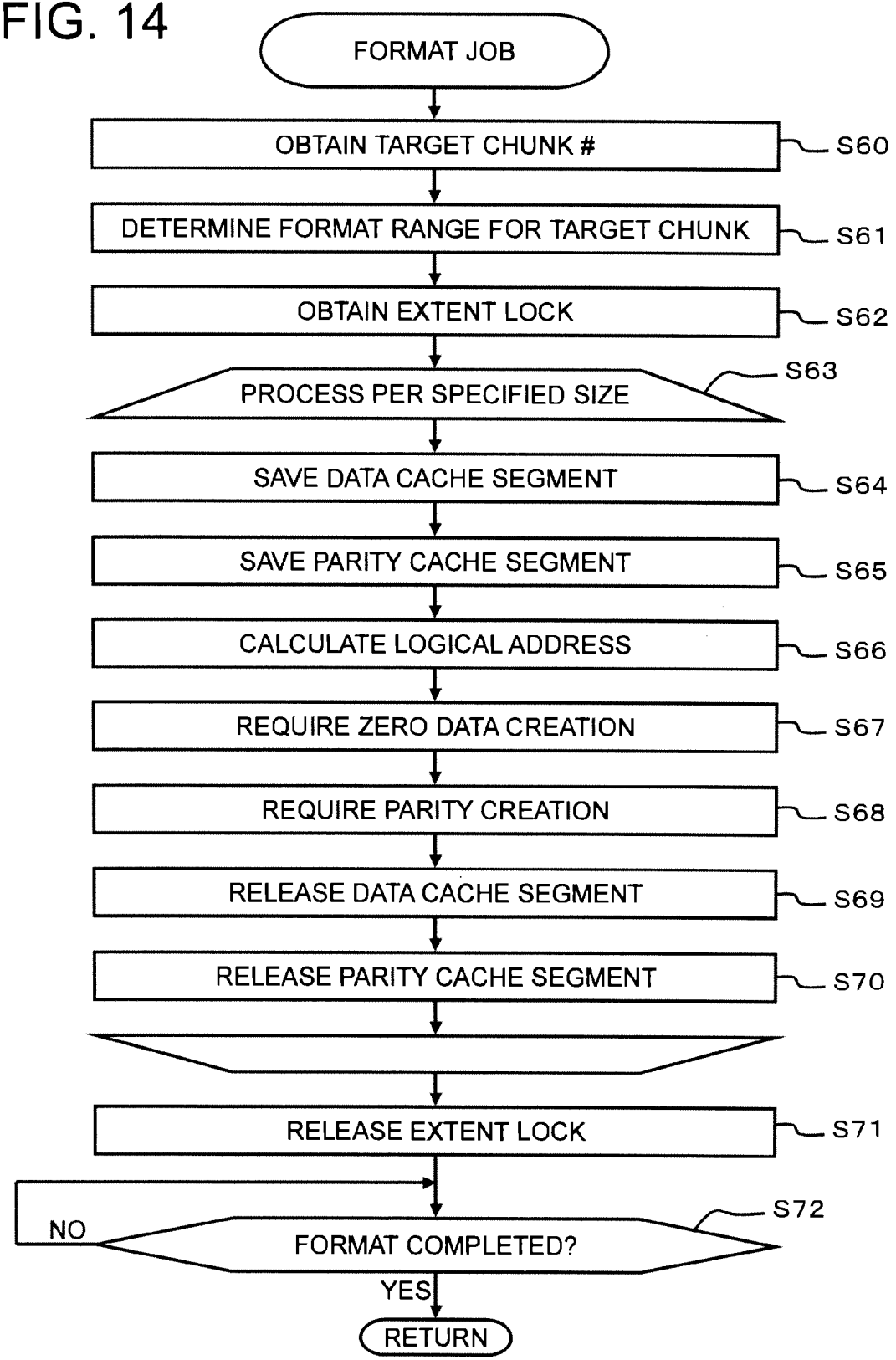
FIG. 14 is a flowchart showing a part of the format processing.

The processing of formatting chunks 91 is described below with reference to FIGS. 13 and 14. FIG. 13 shows the entire format processing, and FIG. 14 shows a part of the format processing.

The controller 30 determines whether there are any chunks 91 waiting to be formatted by confirming the format-waiting chunk queue Q10 or not (S50). If any chunks 91 are registered to the format-waiting chunk queue Q10 (S50: YES), the controller 30 selects a chunk for each RAID group 90 in the pool unit 60 by round-robin processing (S51), and performs the steps S52 to S54 below.

The selection method is described with reference to the example shown in FIG. 12. After one chunk 91 (1-1) is selected from the first RAID group 90 (#1), another chunk 91 (2-1) is selected from the second RAID group 90 (#2), and another chunk 91 (3-1) is selected from the third RAID group 90 (#3). The steps S52 to S54 described below are performed for the selected chunks 91 (1-1), 91 (2-1), and 91 (3-1) respectively. The steps S52 to S54 are also performed for the chunks 91 (1-2), 91 (2-2), and 91 (3-2) respectively. Furthermore, the steps S52 to S54 are also performed for the chunks 91 (1-3), 91 (2-3), and 91 (3-3) respectively. The same steps are also performed for the remaining chunks.

The controller 30 selects one chunk 91 of the target RAID group 90 from the format-waiting chunk queue Q10, and dequeues it from the format-waiting chunk queue Q10 (S52). The controller 30 enqueues the selected chunk 91 in the processing-completion-waiting chunk queue Q20 (S53), and performs the format job for the selected chunks 91 (S54). The details of the format job are described later with reference to FIG. 14.

When the format job is completed, the controller 30 dequeues the formatted chunks 91 from the processing-completion-waiting chunk queue Q20 (S55), and enqueues the formatted chunks 91 in the unallocated chunk queue Q30 (S56).

FIG. 14 is a flowchart showing the details of the format job shown in S54 of FIG. 13. The controller 30 obtains the identification numbers of the processing target chunks 91 (S60), and determines the range of the formatting the target chunks 91 (S61). The controller 30 obtains the extent lock for the target chunks 91 (S62). This prevents the target chunks 91 from being used by the other programs.

The controller 30 performs the steps S64 to S70 described below for each specified size of the target chunks 91 (S63). That is, the controller 30 is supposed to format the target chunks 91 in units of areas of the specified size.

The controller 30 saves data cache segments (S64), and saves parity cache segments (S65). A cache segment is a unit for managing the storage areas of the cache memory 340.

The controller 30 calculates logical addresses (S66), requires the creation of zero data (S67), and requires the creation of parity (S68). Zero data is created using the cache segments saved at S64. Parity is created by using the cache segments saved at S65. The controller 30 releases the cache segments saved for data (S69), and also releases the cache segments saved for parity (S70).

The controller 30 releases the extent lock of the target chunks 91 (S71), confirms the completion of the formatting for the target chunks 91 (S72: YES), and returns to the processing in FIG. 13.

Figure 15:
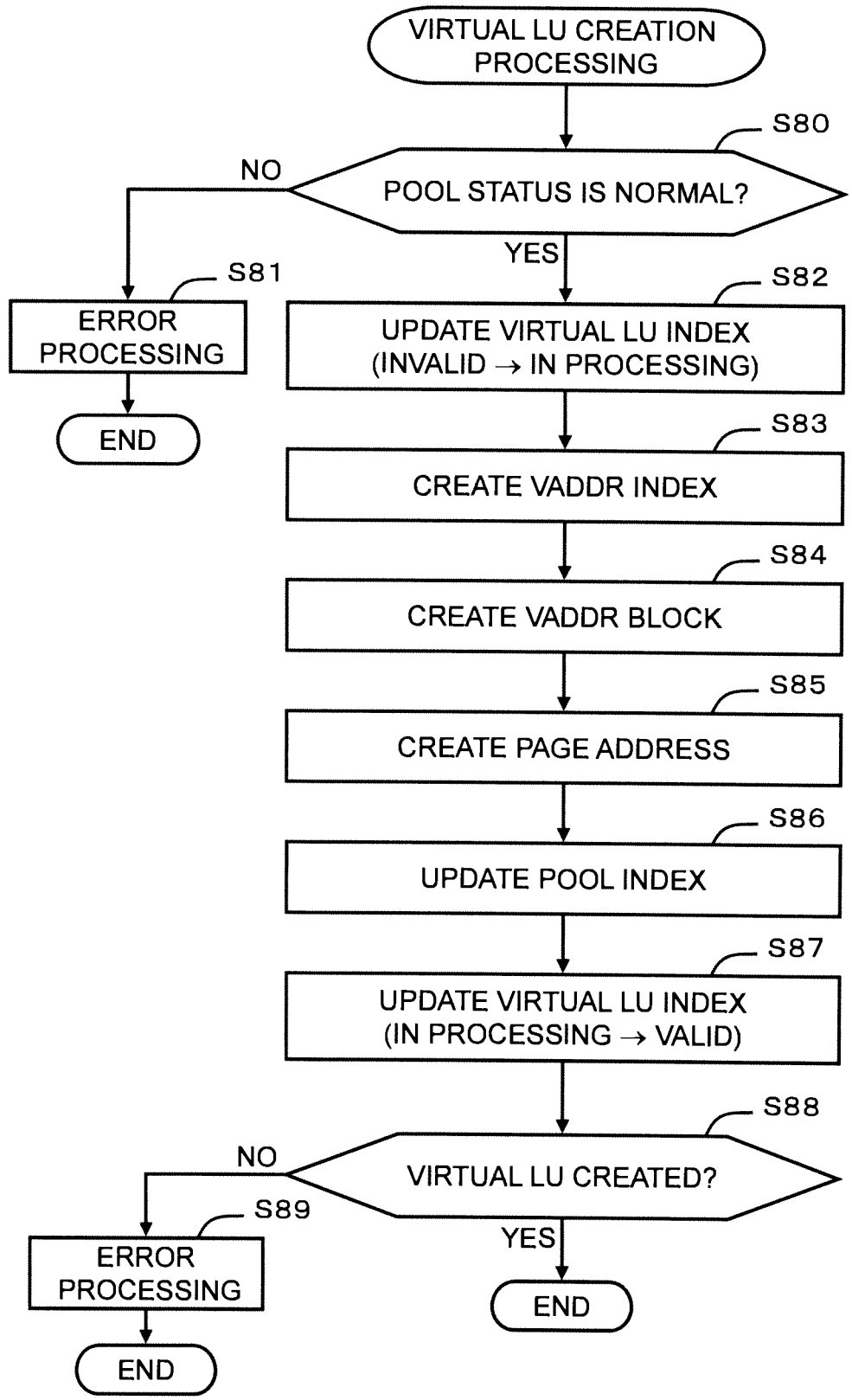
FIG. 15 is a flowchart showing the processing of creating a virtual volume.

FIG. 15 is a flowchart showing the processing of creating a virtual volume 50V. The controller 30 determines whether the pool unit 60 is in the normal status or not (S80). If any failure has occurred to the pool unit 60 (S80: NO), as no virtual volume 50V can be created, the controller 30 performs the error processing (S81). In the error processing, it is, for example, reported to the user that, as the failure has occurred to the pool unit 60, no virtual volume 50V can be created.

If the pool unit 60 is in the normal status (S80: YES), the controller 30 changes the status of the virtual volume index 101 from "Invalid" to "In processing" (S82). For the previously provided identification number of the virtual volume, "Invalid" is preset as the initial value of the status of the virtual volume. While the virtual volume 50V is being created, the status changes from "Invalid" to "In processing." When the creation of the virtual volume 50V is completed, as described later, the status changes from "In processing" to "Valid."

The controller 30 creates the virtual address index 102 for the virtual volume 50V whose status is changed to "In processing" (S83), and creates the virtual address block 103 corresponding with the virtual address index 102 (S84). Furthermore, the controller 30 creates the page address information 104 corresponding with the virtual address block 103 (S85).

The controller 30 updates the in-pool RAID group index 110 (S86), and changes the status of the virtual volume index 101 from "In processing" to "Valid" (S87). The controller 30 confirms whether the creation of the virtual volume 50V was successful or not (S88) and, if the virtual volume 50V was created normally (S88: YES), completes the processing. If it was not normally created (S88: NO), error processing is performed (S89). In the error processing, it is, for example, reported to the user that the virtual volume 50V was not normally created.

Note that, though the description has been made, for convenience, as if whether the virtual volume 50V was created normally or not is determined at the end, whether it was created normally or not is actually determined when creating the tables 101 to 104 respectively. If it was not normally created, the error processing is performed.

By performing the processing shown in FIG. 15, the tables shown in FIG. 6 are created, and the correspondence of each virtual storage area 500 in the virtual volume 50V to a page 92 for initial setting is made. Therefore, once the virtual volume 50V is created normally, it is confirmed that the correspondence of each virtual storage area 500 to an actual page 92 for initial setting can be made normally.

Figure 16:
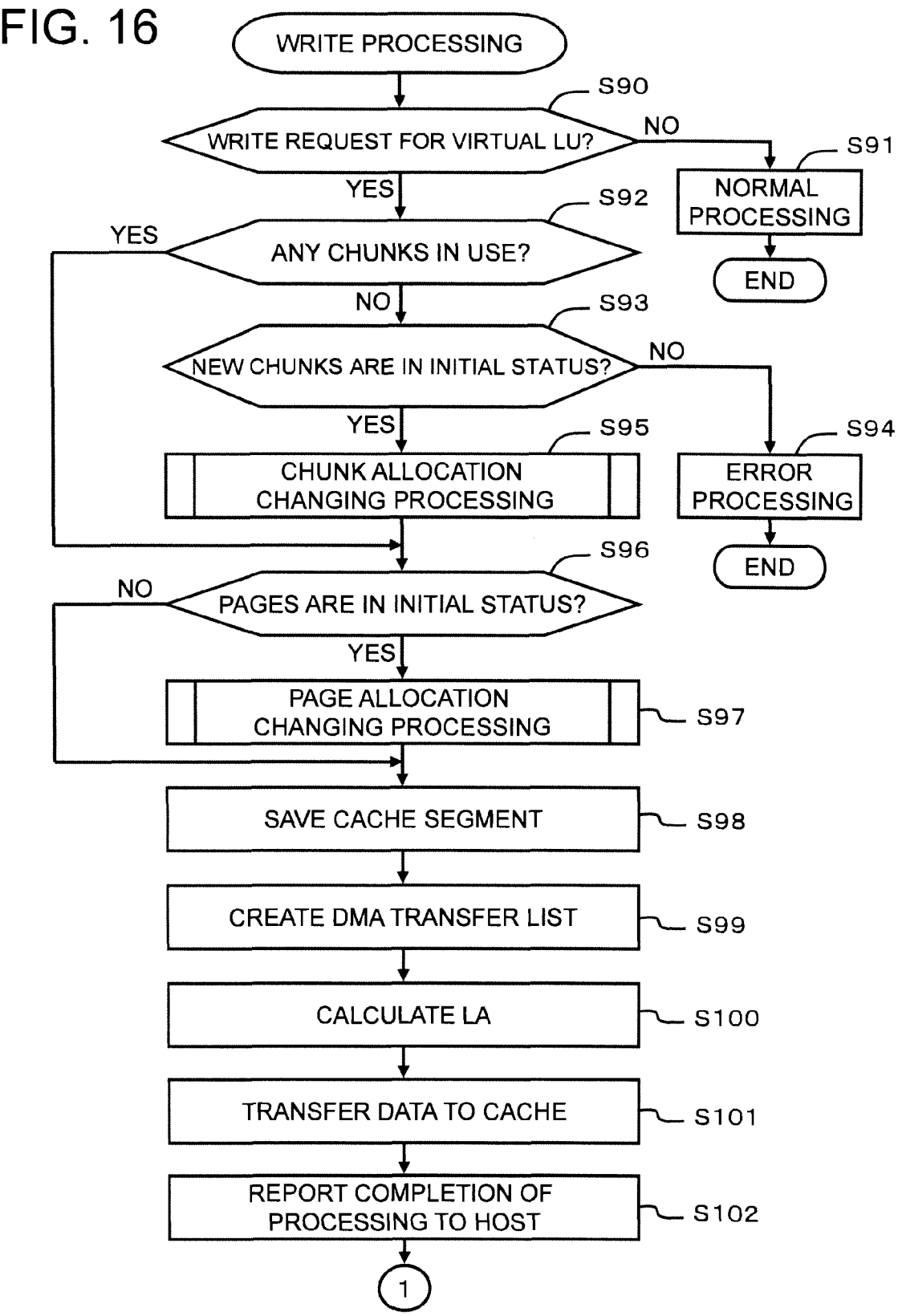
FIG. 16 is a flowchart showing the write processing.

FIG. 16 is a flowchart showing the processing for a write command. The controller 30, when receiving a command from the host 20, determines whether the command is a write command for the virtual volume 50V or not (S90).

If the command is a write command for the normal volume 50N (S80: NO), the controller 30 performs the normal write processing (S91). For example, in the normal write processing, write data received from the host 20 is written in the cache memory 340 and, when writing the write data in the cache memory 340 is completed, the completion of the processing is reported to the host 20. After that, at an appropriate time, the write data stored in the cache memory 340 is written in the storage device 40.

The controller 30, if it receives a write command for the virtual volume 50V (S90: YES), determines whether there are any currently used chunks 91 in the virtual volume 50V or not (S92). If there are any currently used chunks 91 (S92: YES), the processing shifts to S96 described later. If there is no currently used chunks 91 (S92: NO), the controller 30 determines whether the chunks 91 to be newly allocated to the virtual volume 50V are in the initial status or not (S93).

Normally, by the format processing shown in FIG. 13, the new chunks are set to the initial status. If, nevertheless, the new chunks are not in the initial status (S93: NO), the error processing is performed (S94). In the error processing, it is, for example, reported to the user via the management server 70 that there is no chunk 91 in the initial status.

If the new chunks 91 are in the initial status (S93: YES), the controller 30 performs the chunk allocation changing processing (S95). Though details of the chunk allocation changing processing are described in FIG. 18, to quickly describe in advance, the controller 30 selects a chunk 91 from the unallocated chunk queue Q30, makes it correspond with the virtual volume 50V, and changes the status of the chunk 91 to "Allocated (in use)."

The controller 30 determines whether the page 92 to be used, among the pages 92 in the chunk 91, is in the initial status or not (S96). If the page 92 to be used is in the initial status (S96: YES), the page allocation changing processing is performed (S97).

The details of the page allocation changing processing are described later in FIG. 19. To quickly describe, in the page allocation changing processing, the status of the page 92 to be allocated to the virtual volume 50V is changed to "Allocated (in use)," and it updates the virtual address block 103 and the page address information 104. After performing S97, the processing shifts to S98.

If the page 92 to be used is not in the initial status (S96: NO), that is, if the page 92 to be used is not the page for the initial settings, S97 is skipped and the processing shifts to S98.

The controller 30 saves cache segments for storing write data (S98), and creates the DMA (Direct Memory Access) transfer list for transferring write data (S99). The controller 30 calculates the address part of the guarantee code (LA) (S100), and performs DMA transfer of the write data received from the host 20 to the cache memory 340 (S101). After storing write data in the cache memory 340, the controller 30 reports the completion of the write command processing to the host 20 (S102).

The method of reporting the completion of the processing to the host 20 after completing writing the write data in the cache memory 340 is called the asynchronous method. Meanwhile, the method of reporting the completion of the processing to the host 20 after the write data is written in the storage device 40 is called the synchronous method. Either the asynchronous method or the synchronous method can be utilized.

Figure 17:
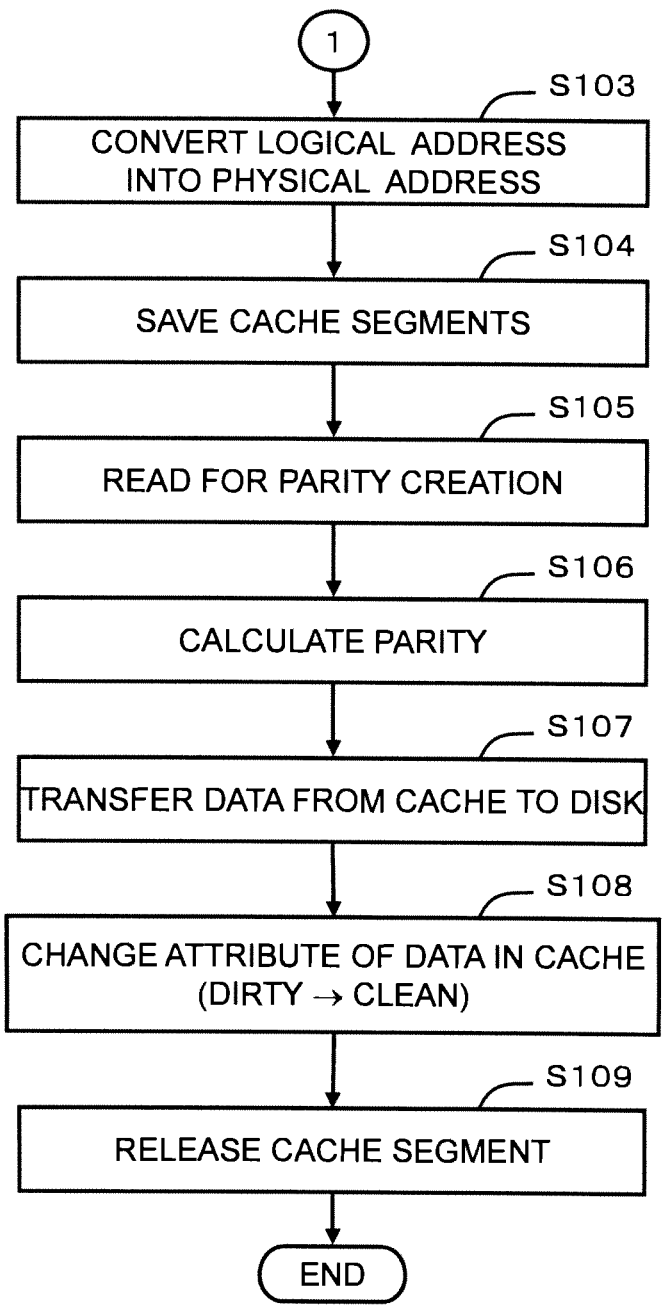
FIG. 17 is a flowchart continued from FIG. 16.

The processing shifts to FIG. 17. The controller 30 converts the logical address set for the write data into the physical address to be stored in the storage device 40 (S103). The controller 30 saves cache segments (S104). The controller 30 reads the old data required for creating parity from the storage device 40 (S105), and stores it in the cache segments saved at S104.

The controller 30, in accordance with the write data received from the host 20 and the old data read from the storage device 40, calculates new parity (S106). The controller 30 transfers the write data stored in the cache memory 340 to the storage device 40 (shown as disks in FIG. 17) and makes it store the data (S107).

The controller 30 changes the status of the write data stored in the cache memory 340 from "Dirty" to "Clean" (S108). The "Dirty" status represents that the data is stored only in the cache memory 340. The "Clean" status represents that the data is written in the storage device 40. Finally, the controller 30 releases the cache segments saved at S98 and S104, and completes this processing (S109).

Figure 18:
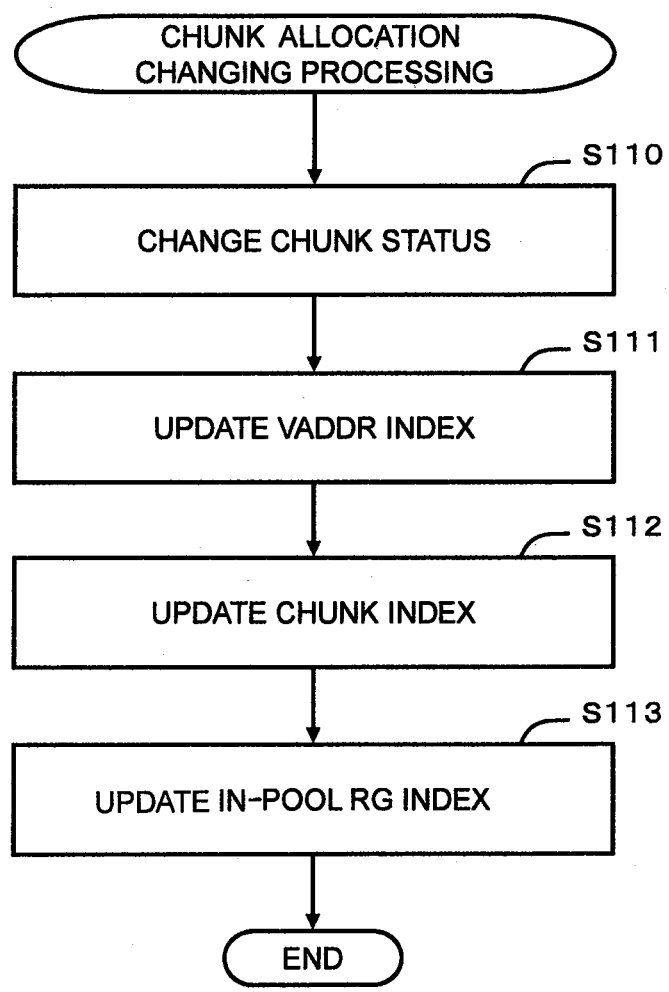
FIG. 18 is a flowchart showing the processing of allocating a chunk to a virtual volume.

FIG. 18 is a flowchart showing the chunk allocation changing processing shown at S95 in FIG. 16. The controller 30 changes the status of the processing target chunk 91 to a specified status (S110).

For example, for allocating a new chunk 91 to the virtual volume 50V, the status of the new chunk 91 is changed from "Unallocated (unused)" to "Allocated (in use)." In other cases, for example, for releasing a chunk 91 allocated to the virtual volume 50V, the status of the chunk 91 is changed from "Allocated (in use)" to "Waiting to be formatted."

The controller 30, after changing the status of the chunk 91, updates the virtual address index 102 corresponding with the chunk 91 (S111). Furthermore, the controller 30 updates the chunk index 120 (S112), and updates the in-pool RAID group index 110 (S113).

Figure 19:
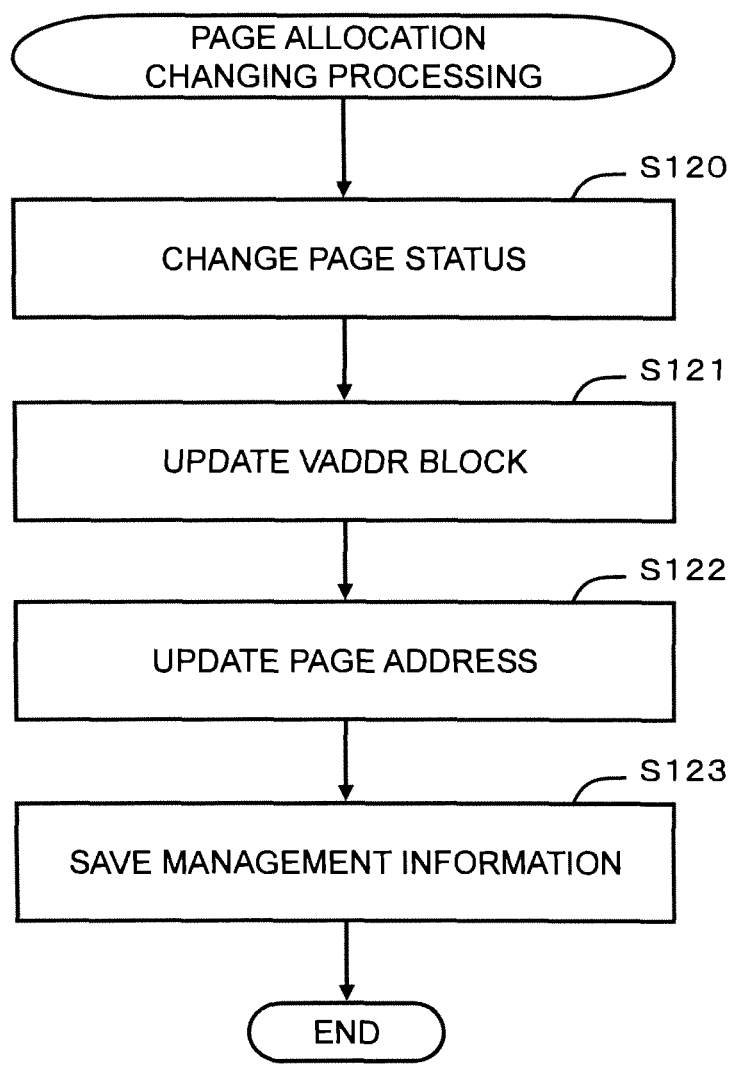
FIG. 19 is a flowchart showing the processing of allocating a page to a virtual volume.

FIG. 19 is a flowchart showing the page allocation changing processing shown at S97 in FIG. 16. The controller 30 changes the status of the processing target page 92 to a specified status (S120). For example, for allocating a new page 92 to a virtual storage area 500 in the virtual volume 50V, the status of the new page 92 is changed from "Unallocated (unused)" to "Allocated (in use)." In other cases, for example, for releasing a page 92 allocated to the virtual volume 50V, the status of the allocated page 92 is changed from "Allocated (in use)" to "Waiting to be formatted." The details of the method for allocating new pages 92 are described later in FIG. 20.

After changing the page status, the controller 30 updates the virtual address block 103 corresponding with the processing target page 92 (S121), updates the page address information 104 (S122) corresponding with the processing target page 92. The controller 30 saves the management information (the tables shown in FIG. 5) to the management information saving area (refer to S23 of FIG. 9) (S123).

Figure 20:
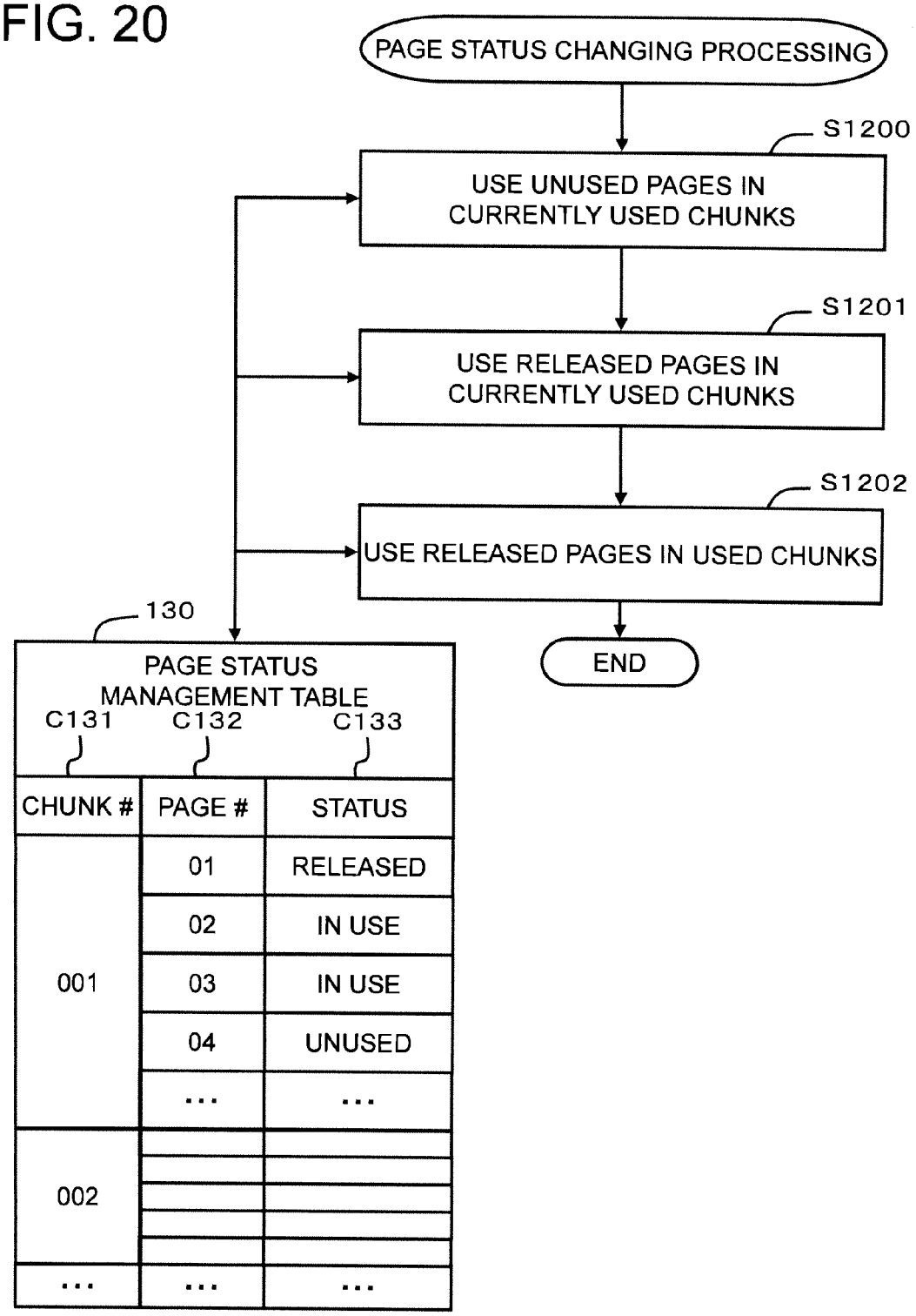
FIG. 20 is a flowchart showing the processing of changing the page status.

FIG. 20 is a flowchart showing a part of the processing shown at S120 in FIG. 19. As mentioned above, in accordance with the write command from the host 20, the physical storage area is allocated to the virtual volume 50V in units of chunks, and the actual pages 92 in the allocated chunks 91 are serially used. If all the allocated chunks were used, new chunks 91 are allocated to the virtual volume 50V. The method for using pages 92 is described with reference to FIG. 20.

The controller 30 includes a page status management table 130 for managing the status of each page 92. The table 130 includes, for example, a chunk identification number field C131, a page identification number field C132, and a page status field C133.

For the page status field C133, for example, any one of the status prepared in advance is set, such as "In use (or allocated)," "Unused (or unallocated)," or "Released (or waiting to be formatted)." Note that, though the description has been made, for convenience, as if the page status management table 130 is separate information from the page address information 104, the page address information 104 can actually manage each page status by itself.

The controller 30 refers to the table 130 and, if there are any unused pages 92 in the currently used chunks 91, uses the unused pages 92 (S1200). If there is no unused page 92 in the currently used chunks 91, the controller 30 refers to the table 130 and, if there are any released pages 92 in the currently used chunks 91, uses the released pages 92 (S1201).

If there is no unused page 92 or released page 92 in the currently used chunks 91, the controller 30 refers to the table 130 and uses the released pages in the used chunks 91 (S1202). That is, the controller 30 detects the released pages 92 from the used chunks 91 of the target virtual volume 50V, and reuses them.

Note that, if there is no released page 92 in the used chunks 91, the controller 30, as described in FIG. 16, makes the unused chunks 91 correspond with the virtual volume 50V, and allocates the head pages 92 of the chunks 91 to the virtual volume 50V.

Figure 21:
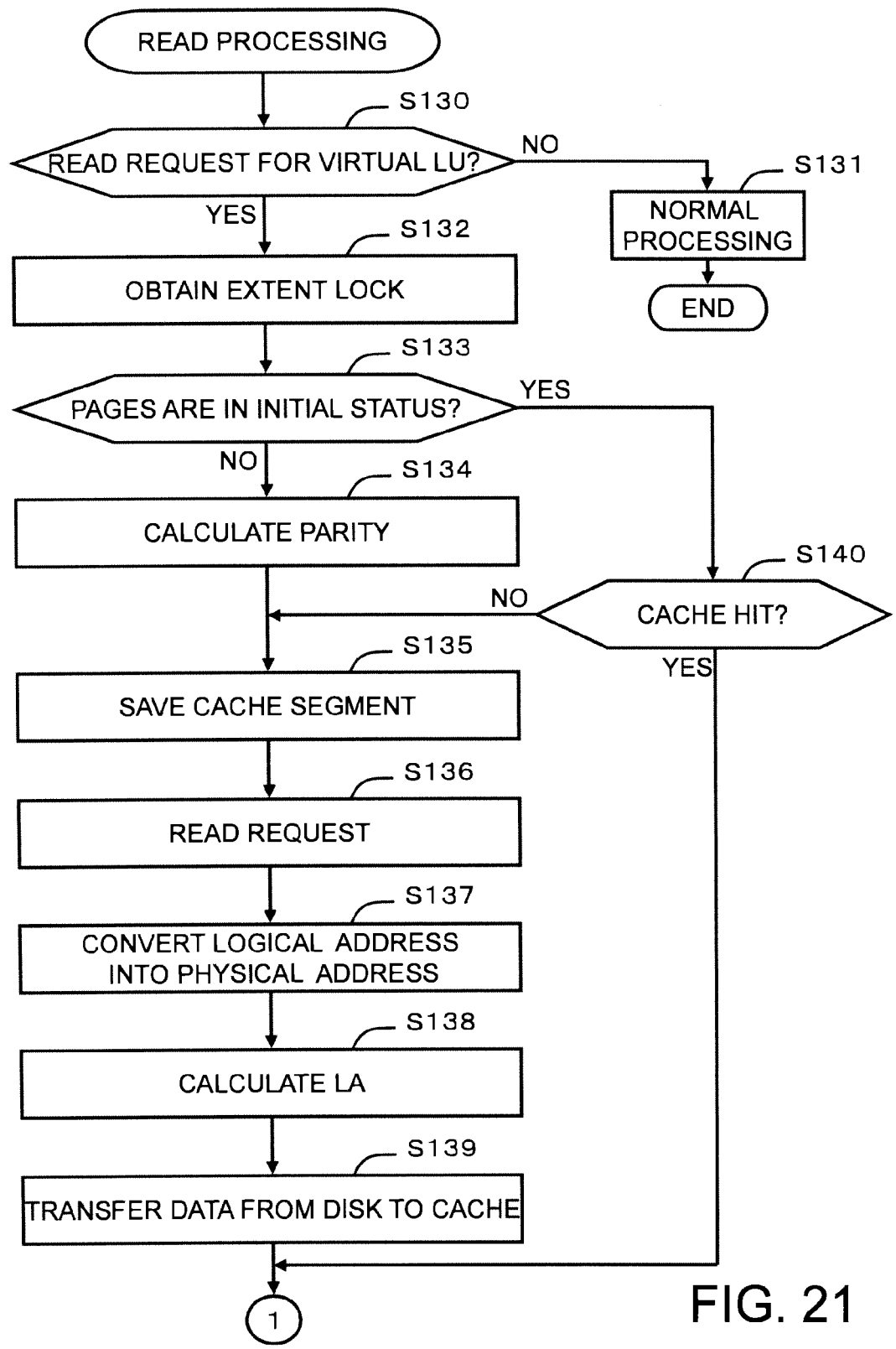
FIG. 21 is a flowchart showing the read processing.

FIG. 21 is a flowchart showing the processing for a read command. The controller 30 determines whether the command received from the host 20 is a read command for the virtual volume 50V or not (S130).

If the command received from the host 20 is a read command for the normal volume 50N (S130: NO), the controller 30 performs the normal read processing (S131). For example, the controller 30 determines whether the data required by the host 20 is stored in the cache memory 340 or not. If the required data is in the cache memory 340, the controller 30 reads the data from the cache memory 340 and transmits it to the host 20. If the data required by the host 20 is not in the cache memory 340, the controller 30 reads the data from the storage device 40, stores it in the cache memory 340, and transmits it to the host 20.

If the command received from the host 20 is a read command for the virtual volume 50V (S130: YES), the controller 30 obtains the extent lock for the read target virtual volume 50V (S132).

The read command specifies the logical address of the data read destination. The controller 30 detects the virtual storage area 500 corresponding with the specified logical address, refers to the tables shown in FIG. 5, and obtains the status of the pages 92 allocated to the virtual storage area 500. The controller 30 determines whether the status of the pages 92 as the read target is in the "initial status" or not (S133).

If the read target pages 92 are in the initial status (S133: YES), the controller 30 determines whether null data to be transmitted to the host 20 is stored in the cache memory 340 or not (S140). As described at S30 in FIG. 9, when creating the pool unit 60, null data is stored in advance in the specified cache segment of the cache memory 340. Therefore, normally, the step S140 is determined to be "YES" and the processing shifts to S141 described later. If null data is not stored in the cache memory 340 (S140: NO), the processing shifts to S135 described later, null data is read from the specified pages of the specified chunk (page for the initial setting, for example) and is transmitted to the host 20 (S135 to S145).

The description returns to S133. If the read target pages 92 are not in the initial status (S133: NO), that is, write data is written in the read target pages, the controller 30 calculates the parity related to the read target data (S134). The controller 30 saves cache segments (S135), and issues a read request to the second communication circuit 320 (S136). The controller 30 converts the logical address into the physical address (S137), and calculates the address part of the guarantee code (LA) (S138). The controller 30 makes the storage device 40 transfer the read target data to the cache memory 340 via the second communication circuit 320 (S139).

Figure 22:
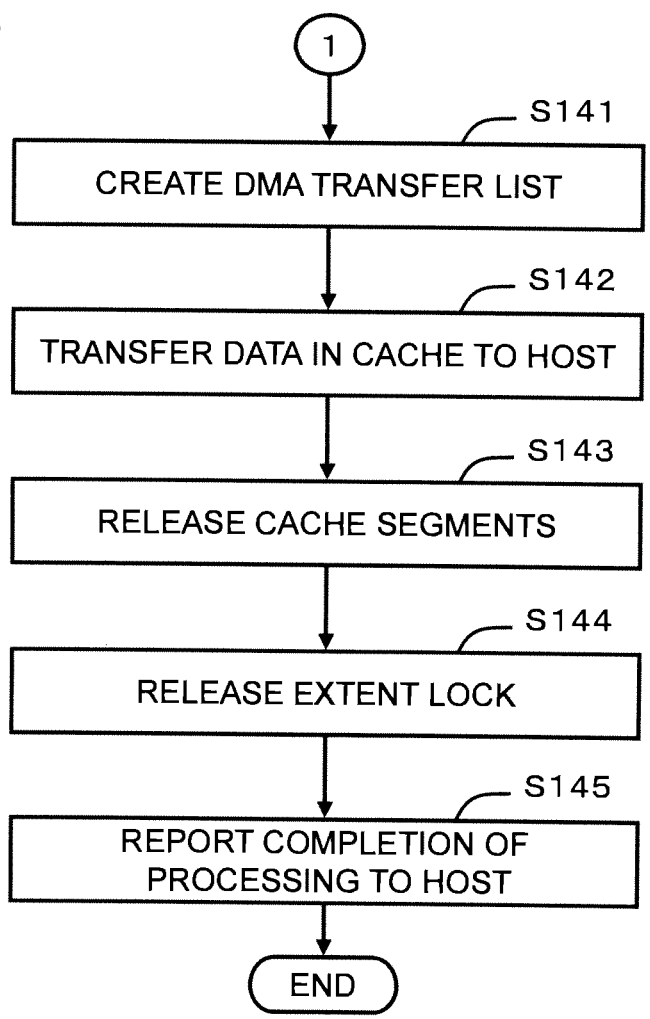
FIG. 22 is a flowchart continued from FIG. 21.

The processing shifts to FIG. 22. The controller 30 sets the DMA transfer list for performing DMA transfer from the cache memory 340 to the first communication circuit 310 (S141). The controller 30 transmits the data stored in the cache memory 340 to the host 20 via the first communication circuit 310 (S142).

When data transfer is completed, the controller 30 releases the cache segments saved at S135 (S143), and also releases the extent lock (S144). Finally, the controller 30 reports the completion of the read command processing to the host 20 (S145), and completes this processing.

Figure 23:
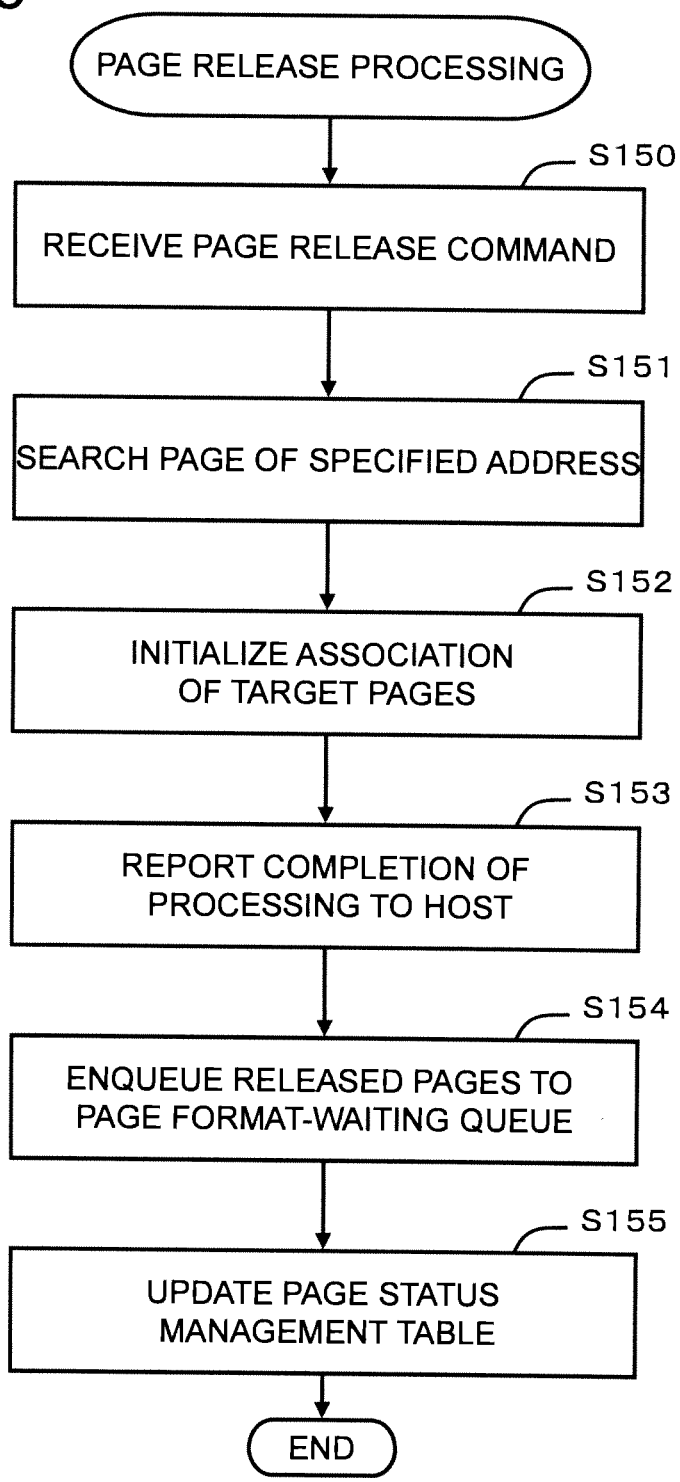
FIG. 23 is a flowchart showing the processing of releasing a page previously allocated to a virtual volume.

FIG. 23 is a flowchart showing the processing for releasing the pages 92 allocated to the virtual volume 50V. The controller 30 receives a command for releasing the allocated pages 92 from the host 20 (S150).

The controller 30 searches for the pages 92 corresponding with the logical address specified by the release command by referring to the tables shown in FIG. 5 (S151). The controller 30 initializes the association of the detected release target pages 92 (S152), that is, releases the pages 92 corresponding with a specific virtual storage area 500 in the virtual volume 50V from the virtual storage area 500, and returns them to the initial status.

The controller 30 reports the completion of the processing to the host 20 which is the source of the issued command (S153). Next, the controller 30 enqueues the released pages in the page format-waiting queue (S154), and updates the status of the released pages in the page status management table 130 (S155).

In the embodiment of the above-mentioned configuration, the physical storage area is allocated to the virtual volume 50V in units of chunks 91 including multiple pages 92 and, at the same time, does not mix the pages 92 for multiple virtual volumes 50V in one chunk 91. That is, one chunk 91 is used only for one virtual volume 50V.

Therefore, in this embodiment, as shown in FIG. 24, RAID groups 90 which are physical storage areas can be utilized efficiently. FIGS. 24 (24(a) and 24(b)) is a schematic view showing the advantages of this invention. FIG. 24(a) shows the case where this invention is not applied and FIG. 24(b) shows the case where this invention is applied.

The case of the normal volume 50N is described first. In the case of the normal volume 50N, serial storage areas in a RAID group 90 can be used. Therefore, data related to multiple normal volumes 50N are not mixed in one stripe line.

In the case of the virtual volume 50V, the physical storage area is allocated if necessary, and data is managed discretely. If the physical storage area is allocated to the virtual volume in units of pages, it is necessary to control the mixture of the data related to multiple virtual volumes in the same stripe line because, if multiple volumes are mixed in the same stripe line, the processing for parity creation and others becomes complicated and the overhead at the time of data input/output increases, which deteriorates the performance of the storage control device.

Therefore, as shown in FIG. 24(a), the method of storing data by placing the head of each page at the head of each stripe line can be considered. This method prevents the mixture of the data of different volumes in one vertical stripe line.

However, as the storage control device 10 of this embodiment can set the number of storage devices 40 configuring a RAID group 90 freely, the page size does not necessarily match the stripe size. If the page size does not match the stripe size and the head of each page is placed to match the head of each strip line, useless areas are created as shown by blank areas in FIG. 24(a). Therefore, the method shown in FIG.

24(*a*) has the problem that the physical storage area included in the RAID group 90 cannot be efficiently utilized and that the use efficiency is low.

Therefore, this invention, as shown in FIG. 24(*b*), instead of allocating the physical storage area to the virtual volume in units of pages, allocates the physical storage area to the virtual volume in units of chunks 91 including multiple pages. Then, as mentioned above, each time a write command for the virtual volume 50V is received, the pages 92 in the chunk 91 are serially used. Each page 92 in the chunk 91 is made to correspond to the same virtual volume 50V. The pages 92 related to different virtual volumes are not mixed in the same chunk 91. As mentioned above, this embodiment achieves the efficient use of the physical storage area included in the RAID group 90.

This embodiment, as mentioned above, does not particularly separate the identification numbers of virtual volumes 50V and the identification numbers of normal volumes 50N, and manages all the volumes 50V and 50N by sequence numbers. Furthermore, this embodiment does not particularly separate the RAID groups 90 used for the virtual volumes 50V and the RAID groups 90 for the normal volumes 50N, and manages them by sequence numbers. Therefore, the storage control device 10 of this embodiment manages virtual volumes 50V and normal volumes 50N in common in the relatively simple control structure, and can mix both virtual volumes 50V and normal volumes 50N.

In this embodiment, chunks 91 are serially selected from multiple RAID groups 90 and allocated to the virtual volume 50V. Therefore, the load among the RAID groups 90 in the pool unit 60 can be evenly distributed.

In this embodiment, as described in FIG. 6 and FIG. 15, the tables 100 to 104 are related when creating a virtual volume 50V, and all the virtual storage areas 500 in the virtual volume 50V are allocated to the pages 92 for the initial setting.

Therefore, in this embodiment, once the virtual volume 50V is created normally, it can be confirmed that the correspondence of the virtual storage areas 500 with the actual pages 92 is made normally. That is, in this embodiment, before a write command is received, the temporary allocation of chunks 91 and pages 92 for the initial setting to the virtual volume 50V is completed. By this, it can be confirmed in advance whether the virtual volume 50V operates normally or not before receiving the write command, which improves the reliability and the usability.

Furthermore, in this embodiment, when receiving a write command, changing the correspondence destination of the virtual storage area 500 corresponding with the logical address specified by the write command from the temporarily allocated pages 92 for the initial setting to the specified pages 92 in the specified chunks 91 is all that is required to be done. This can achieve the relatively rapid processing of the write command and improve the response performance of the storage control device 10.

In this embodiment, from the previously used chunks 91 for the same virtual volume 50V, the released pages 92 are detected and reused for other write processing. Therefore, the physical storage area included in the RAID group 90 can be utilized even more efficiently.

This embodiment manages the address spaces in the virtual volume 50V at two steps, i.e., by the virtual address index 102 and by the virtual address block 103. By this method, the search range of the logical address specified by the command from the host 20 can be narrowed immediately, and the pages 92 corresponding with the logical address can be detected immediately, which can improve the response performance related to the virtual volume 50V.

Example 2

The second embodiment is described with reference to FIGS. 25 to 27. The other embodiments including this embodiment refer to the first embodiment. Therefore, the description below is made focusing on the differences from the first embodiment. This embodiment refers to the case where copy is performed among multiple virtual volumes 50VP and 50VS in the storage control device 10.

Figure 25:
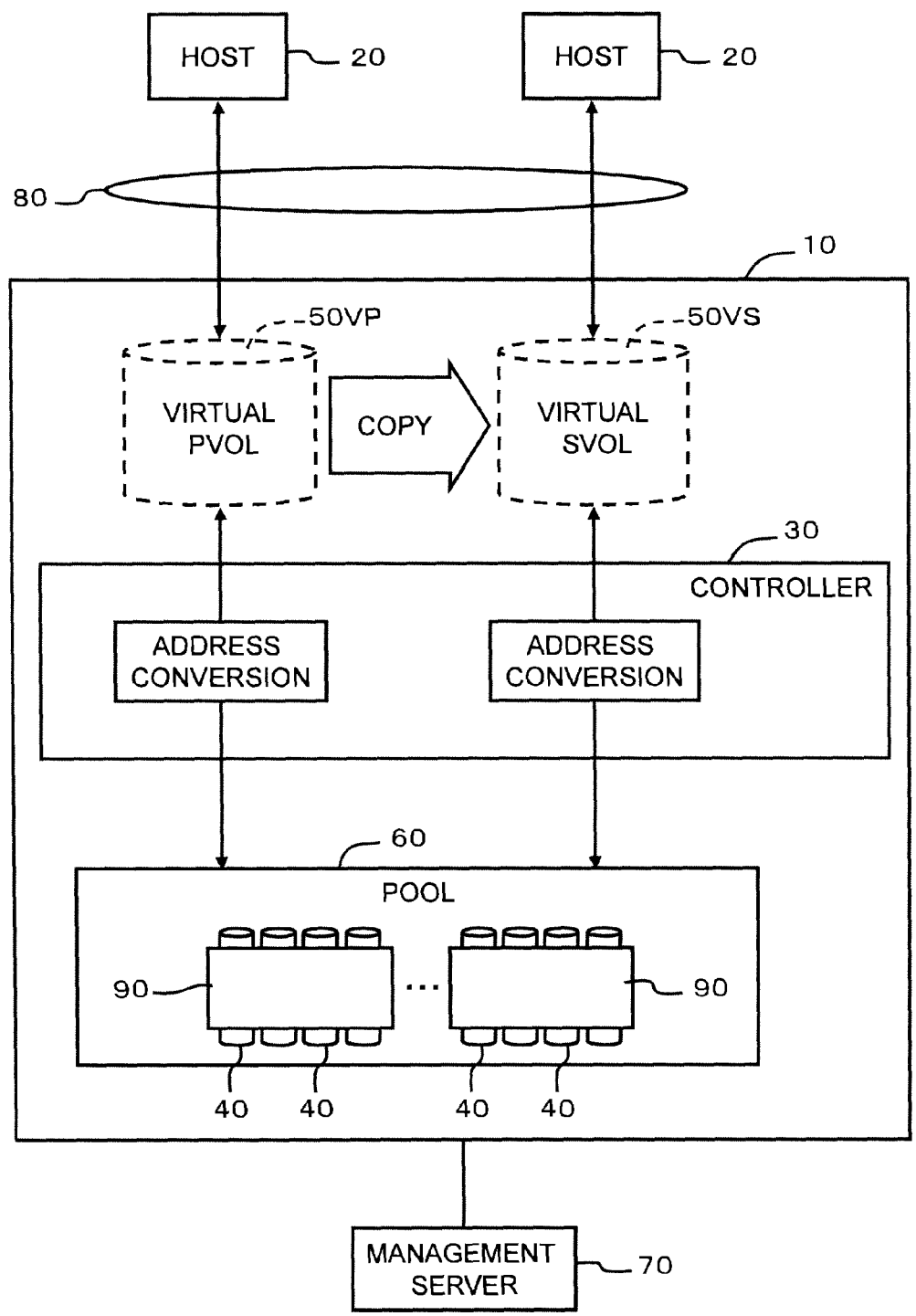
FIG. 25 is a diagram showing the entire system including the storage control device related to the second embodiment.

FIG. 25 is a schematic view showing the overall configuration of the system by this embodiment. The storage control device 10 of this embodiment includes multiple virtual volumes 50VP and 50VS. One virtual volume 50VP is a primary volume, and the other virtual volume 50VS is a secondary volume. In the description below, there are cases where they are referred to as a virtual primary volume 50VP (or a copy source volume) and a virtual secondary volume 50VS (or a copy destination volume).

The virtual primary volume 50VP and the virtual secondary volume 50VS form a copy pair, and are controlled for matching the stored data in both of the volumes 50VP and 50VS with each other. For that purpose, an initial copy is performed first, and then an update copy is performed.

The initial copy is the copy processing in which the stored data in the virtual primary volume 50VP is transferred to and stored in the virtual secondary volume 50VS. When the initial copy is completed, the stored data in both of the volumes 50VP and 50VS match with each other. The details of the initial copy are described in FIG. 26. The initial copy is sometimes referred to as the creation copy.

After the initial copy is completed, as the stored data in the virtual primary volume 50VP is updated, the updated data is transferred to the virtual secondary volume 50VS, and the stored data in the virtual secondary volume 50VS is also updated. This processing is called the update copy. The details of the update copy are described in FIG. 27.

Figure 26:
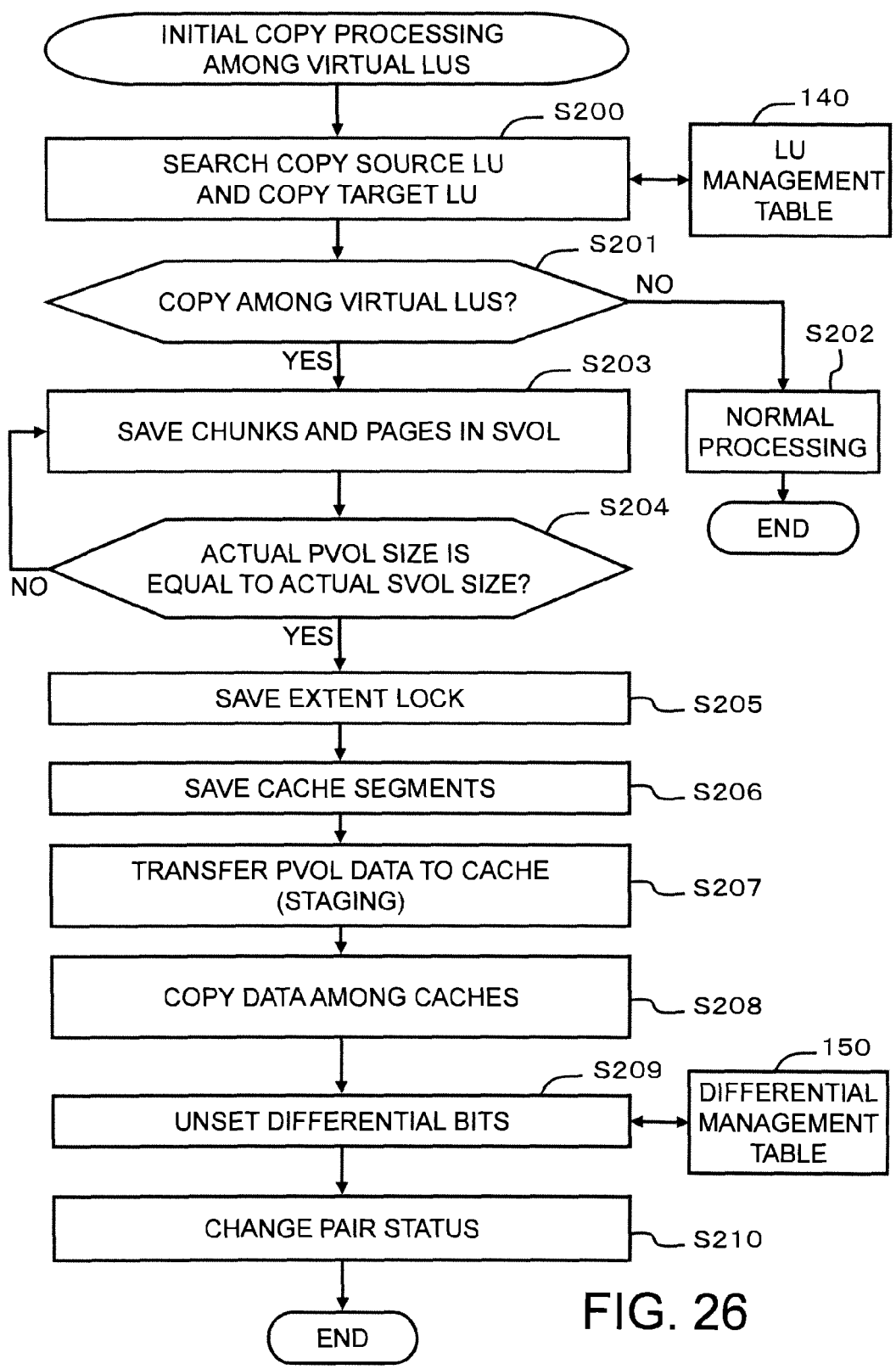
FIG. 26 is a flowchart showing the processing of performing initial copy among virtual volumes.

FIG. 26 is a flowchart showing the processing of the initial copy among the virtual volumes 50VP and 50VS. The controller 30, when receiving a command for performing the initial copy from the host 20 or the management server 70, searches the copy source volume 50VP and the copy destination volume 50VS (S200).

By the initial copy command, the copy source volume 50VP and the copy destination volume 50VS are specified. The controller 30 includes a volume management table 140 for the unified management of the virtual volumes 50V and the normal volumes 50N.

The volume management table 140 manages, for example, the volume numbers for identifying each virtual volume 50V and each normal volume 50N, the status of the volumes, the types of the volumes, the number list of the storage devices 40 configuring the volumes, and other information. By referring to the volume management table 140, it can be determined whether the volume specified by the initial copy command is a virtual volume 50V or a normal volume 50N.

The controller 30 determines whether the initial copy among the virtual volumes is required or not (S201). If it is not the command requiring the initial copy among the virtual volumes (S201: NO), the controller 30 performs the normal initial copy (S202).

For performing the initial copy among the virtual volumes (S201: YES), the controller 30 allocates chunks 91 and pages 92 to the virtual secondary volume 50VS (S203). The controller 30 allocates chunks 91 and pages 92 to the virtual secondary volume 50VS until the actual size of the virtual primary volume 50VP matches the size of the virtual secondary volume 50VS (S204). The actual size represents the total size of the chunks actually allocated to the virtual volumes. In other words, it is the size of the physical storage area allocated to the virtual volumes.

When the actual size of the virtual secondary volume 50VS matches the size of the virtual primary volume 50VP (S204: YES), the controller 30 obtains the extent locks for the virtual primary volume 50VP and the virtual secondary volume 50VS respectively (S205), and saves cache segments (S206).

The controller 30 transfers data stored in the virtual primary volume 50VP from the storage devices 40 to the cache memory 340 and stores it (S207). That is, the data of the virtual primary volume 50VP is transferred from the pages 92 allocated to the virtual primary volume 50VP to the cache memory 340 and stored.

The controller 30 performs data copy among the caches (S208). For example, if one cache segment in a cache memory 340 is made to correspond with the virtual primary volume 50VP and another storage control device using the same cache memory 340 is made to correspond with the virtual secondary volume 50VS, the data is transferred from the one cache segment to the other cache segment. In other cases, if the cache segments in one cache memory 340 are made to correspond with the virtual primary volume 50VP and the cache segments in another cache memory 340 are made to correspond with the virtual secondary volume 50VS, the data is transferred from the cache segments in one cache memory 340 to the cache segments in the other cache memory 340.

The controller 30 unsets the differential bits in a differential management table 150 (S209), and changes the status of the copy pair of the virtual primary volume 50VP and the virtual secondary volume 50VS from "in copy" to "pair" (S210). Note that the "pair" status represents that the initial copy from the virtual primary volume 50VP to the virtual secondary volume 50VS is completed.

The differential management table 150 is a table for managing the difference between the stored data in the virtual primary volume 50VP and the stored data in the virtual secondary volume 50VS. The differential management table 150 can manage the difference in specified management units. The areas with difference are set to On while the areas without difference are set to Off.

Figure 27:
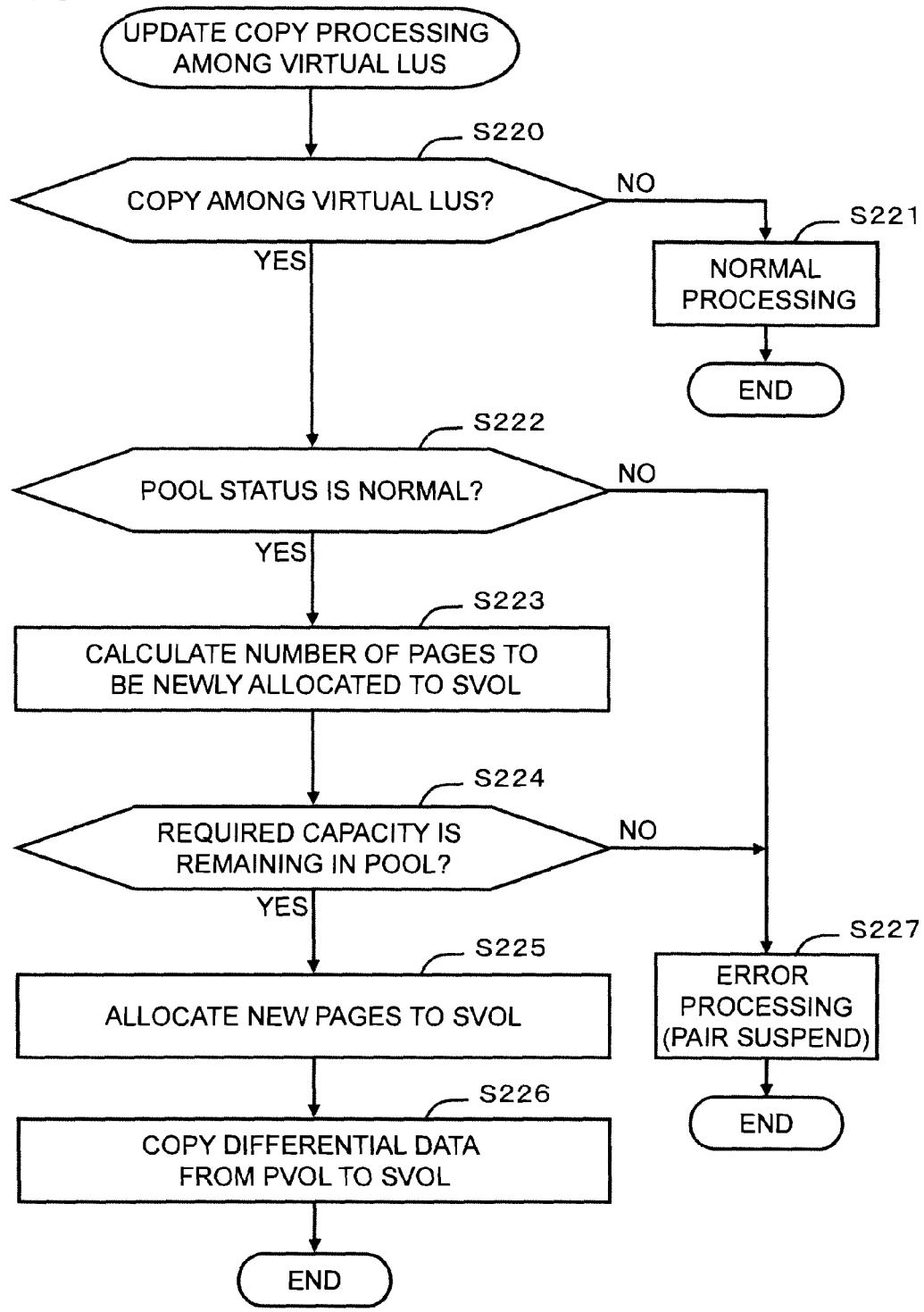
FIG. 27 is a flowchart showing the processing of performing update copy among virtual volumes.

FIG. 27 is a flowchart showing the update copy. For example, if the total size of the data updated in the virtual primary volume 50VP reaches a specified value or in other cases, the update copy from the virtual primary volume 50VP to the virtual secondary volume 50VS is started.

If the trigger for the update copy arises, the controller 30 determines whether it is for the update copy among the virtual volumes or not (S220). If it is not the update copy among the virtual volumes 50V (S220: NO), the normal update copy processing is performed (S221).

In the case of the update copy among the virtual volumes (S220: YES), the controller 30 determines whether the status of the pool unit 60 is normal or not (S222). If the status of the pool unit 60 is not normal (S222: NO), error processing is performed (S227). In the error processing, an error message is reported to the user, and the status of the copy pair is changed to "pair suspend."

If the status of the pool unit 60 is normal (S222: YES), the controller 30 calculates the number of pages to be newly allocated to the virtual secondary volume 50VS (S223). The controller 30 determines whether the number of unused pages 92 in the pool unit 60 is equal to or larger than the number calculated at S223 or not (S224).

If the number of unused pages is equal to or larger than the required number in the pool unit 60 (S224: YES), the controller 30 allocates the required number of pages 92 for the update copy to the virtual secondary volume 50VS (S225). The controller 30 transfers the differential data among both of the volumes 50VP and 50VS from the virtual primary volume 50VP to the virtual secondary volume 50VS, and stores the differential data in the virtual secondary volume 50VS (S226).

This embodiment configured as mentioned above also has the same advantageous effects as the first embodiment. Furthermore, in this embodiment, when forming a copy pair of virtual volumes, unused pages 92 of the required number for the copy can be allocated to the virtual secondary volume 50VS. Therefore, the copy pair can be formed by effectively utilizing the physical storage area in the pool unit 60.

Example 3

A third embodiment is described below with reference to FIG. 28. In this embodiment, the processing-completion-waiting chunk queue Q20 and the unallocated chunk queue Q30 are prepared for each RAID group, and chunks 91 are removed from each RAID group 90 in the specified order and used.

In the first embodiment, as shown in FIG. 12, only one unallocated chunk queue Q30 is prepared, and the formatted chunks in the RAID groups 90 are enqueued to the unallocated chunk queue Q30 in the specified order.

As mentioned above, in accordance with the write access to the virtual volume 50V, unused chunks 91 are selected from the unallocated chunk queue Q30 and allocated to the virtual volume 50V. Therefore, if one host 20 uses only one virtual volume 50V, chunks 91 in each RAID group 90 are serially allocated to the virtual volume 50V, and the load is evenly distributed among the RAID groups 90.

Meanwhile, if multiple hosts 20 use different virtual volumes 50V respectively, depending on the causes such as the frequency of write accesses, the timing of write accesses, or the size of write data, chunks 91 in each RAID group 90 might not be evenly allocated to each virtual volume 50V. If the chunks 91 configuring each virtual volume 50V concentrate on a particular RAID group 90, there might be cases where the load can not be evenly distributed among the RAID groups 90.

Therefore, in this embodiment, for each RAID group 90, the processing-completion-waiting chunk queue Q20 and the unallocated chunk queue Q30 are prepared. Therefore, in the chunks allocation changing processing shown in FIG. 18, for allocating unused chunks 91 to the virtual volume 50V, unused chunks 91 are selected serially from each RAID group 90 and allocated (S110).

This embodiment configured as mentioned above also has the same effects as the first embodiment. Furthermore, in this embodiment, as the queues Q10 to Q30 for managing chunks are prepared for each RAID group, the number of chunks 91 allocated from each RAID group 90 to each virtual volume 50V is made even, which can distribute the load.

Furthermore, in this embodiment, as the queues Q10 to Q30 are prepared for each RAID group, it is also possible to configure a virtual volume 50V evenly using chunks 91 of different RAID levels.

Note that the scope of this invention is not limited to the above-mentioned embodiments. Those skilled in the art may make various types of modification or addition in the scope of this invention by, for example, appropriately combining the above-mentioned embodiments.

The invention claimed is:

1. A storage control device comprising:
a controller, managing a plurality of first storage areas provided with a plurality of storage devices, and dividing each of the plurality of first storage areas into a plurality of second storage areas, each of the plurality of first storage areas having a first fixed area size, each of the second plurality of storage areas having a second fixed area size being smaller than the first fixed area size, and
wherein the controller is adapted to:
provide a plurality of virtual volumes of a predetermined size to a computer,
allocate a particular first storage area exclusively to a first virtual volume of the plurality of virtual volumes, when a first write command from the computer to the first virtual volume is received,
write data of the first write command to a second storage area of the plurality of second storage areas in the allocated particular first storage area, and
receive a second write command from the computer to the first virtual volume and write data of the second write command to another second storage area of the plurality of second storage areas in the allocated particular first storage area irrespective of the address to which the second write command is directed.

2. The storage control device according to claim 1, wherein:
the controller is adapted to release an allocation of a particular second storage area for reading data from a virtual storage area belonging to a plurality of virtual storage areas of the first virtual volume in a status that the particular first storage area is allocated to the first virtual volume.

3. The storage control device according to claim 2, wherein:
the controller is adapted to allocate another first storage area of the plurality of first storage areas to a second virtual volume, when another write command to the second virtual volume of the plurality of virtual volumes is received, so that data of the another write command are written to another second storage area of another plurality of second storage areas in the allocated another first storage area.

4. The storage control device according to claim 3, wherein:
the controller is adapted to release an allocation of another second storage area for reading data from another virtual storage area belonging to another plurality of virtual storage areas of the second virtual volume in a status that the another first storage area is allocated to the second virtual volume.

5. The storage control device according to claim 2, wherein:
the controller is adapted to allocate another first storage area of the plurality of first storage areas to the first virtual volume, when another write command to the first virtual volume is received and if the plurality of second storage areas are allocated to the first virtual volume, so that data of the another write command are written to another second storage area of another plurality of second storage areas in the allocated another first storage area.

6. The storage control device according to claim 5, wherein:
the controller is adapted to release an allocation of another second storage area for reading data from another virtual storage area belonging to the plurality of virtual storage areas of the first virtual volume in a status that the another first storage area is allocated to the first virtual volume.

7. The storage control device according to claim 5, wherein:
the particular first storage area is selected from a (RAID) group of a plurality of first storage devices in the plurality of storage devices, and
the another first storage area is selected from another RAID group of a plurality of second storage devices in the plurality of storage devices.

8. The storage control device according to claim 1, wherein:
the controller is adapted to release the allocation of the particular first storage area from the first virtual volume.

9. The storage control device according to claim 8, wherein:
the release is processed in response to a command sent from a computer for releasing.

10. The storage control device according to claim 1, wherein:
the first fixed area size of each of the plurality of first storage areas is 1 GB.

11. The storage control device according to claim 1, wherein:
each of the plurality of first storage areas is a chunk, or each of the plurality of second storage areas is a page.

12. The storage control device according to claim 1, wherein:
all of the plurality of second storage areas in the particular first storage area are used for the first virtual volume in a status that the particular first storage area is allocated to the first virtual volume.

13. The storage control device according to claim 1, further comprising:
the plurality of storage devices.

14. A control method for a storage control device, comprising the steps of:
managing a plurality of first storage areas provided with a plurality of storage devices and dividing each of the plurality of first storage areas into a plurality of second storage areas, each of the plurality of first storage areas having a first fixed area size, each of the second plurality of storage areas having a second fixed area size which is smaller than the first fixed area size,
providing a plurality of virtual volumes of a predetermined size to a computer,
allocating, when a first write command from the computer to a first virtual volume of a plurality of virtual volumes is received, a particular first storage area exclusively to the first virtual volume,
writing data of the first write command to a second storage area of the plurality of second storage areas in the allocated particular first storage area, and
receiving a second write command from the computer to the first virtual volume and writing data of the second write command to another second storage area of the plurality of second storage areas in the allocated particular first storage area irrespective of the address to which the second write command is directed.

15. The control method for the storage control device according to claim 14, further comprising the step of:
releasing an allocation of a particular second storage area for reading data from a virtual storage area belonging to a plurality of virtual storage areas of the first virtual volume in a status that the particular first storage area is allocated to the first virtual volume.

16. The control method for the storage control device according to claim 15, further comprising the step of:
allocating, when another write command to a second virtual volume of the plurality of virtual volumes is received, another first storage area of the plurality of first storage areas to the second virtual volume so that data of the another write command are written to another second storage area of another plurality of second storage areas in the allocated another first storage area.

17. The control method for the storage control device according to claim 16, further comprising the step of:
releasing an allocation of the another second storage area for reading data from another virtual storage area belonging to another plurality of virtual storage areas of the second virtual volume in a status that the another first storage area is allocated to the second virtual volume.

18. The control method for the storage control device according to claim 15, further comprising the step of:
allocating, when another write command to the first virtual volume is received and if the plurality of second storage areas are allocated to the first virtual volume, another first storage area of the plurality of first storage areas to the first virtual volume so that data of the another write command are written to another second storage area of another plurality of second storage areas in the allocated another first storage area.

19. The control method for the storage control device according to claim 18, further comprising the step of:
releasing the allocation of the another second storage area for reading data from another virtual storage area belonging to the plurality of virtual storage areas of the first virtual volume in a status that the another first storage area is allocated to the first virtual volume.

20. The control method for the storage control device according to claim 18, further comprising the steps of:
selecting the particular first storage area from a (RAID) group of a plurality of first storage devices in the plurality of storage devices, and
selecting the another first storage area from another RAID group of a plurality of second storage devices in the plurality of storage devices.

21. The control method for the storage control device according to claim 14, further comprising the step of:
releasing the allocation of the particular first storage area from the first virtual volume.

22. The control method for the storage control device according to claim 21, further comprising the step of:
receiving a command sent from a computer for releasing, wherein the release is processed in response to the command.

23. The control method for the storage control device according to claim 14, wherein:
the first fixed area size of each of the plurality of first storage areas is 1 GB.

24. The control method for the storage control device according to claim 14, wherein:
each of the plurality of first storage areas is a chunk, or each of the plurality of second storage areas is a page.

25. The control method for the storage control device according to claim 14, further comprising the step of:
using all of the plurality of second storage areas in the particular first storage area for the first virtual volume in a status that the particular first storage area is allocated to the first virtual volume.

26. A storage control device comprising:
a controller, managing a plurality of first storage areas provided with a plurality of storage devices, and dividing each of the plurality of first storage areas into a plurality of second storage areas, each of the plurality of first storage areas having a first fixed area size, each of the plurality of second storage areas having a second fixed area size being smaller than the first fixed area size, and
wherein the controller is adapted to:
provide a plurality of virtual volumes of a predetermined size to a computer,
allocate a particular first storage area exclusively to a first virtual volume of the plurality of virtual volumes, when a first write command from the computer to the first virtual volume is received,
write data of the first write command to a second storage area of the plurality of second storage areas in the allocated particular first storage area, and
receive a second write command from the computer to the first virtual volume and write data of the second write command to another second storage area of the plurality of second storage areas in the allocated particular first storage area irrespective of the address to which the second write command is directed,
wherein the plurality of second storage areas in the allocated particular first storage area are used for any address of the first virtual volume.

* * * * *